US008096873B2

(12) United States Patent
Walker et al.

(10) Patent No.: US 8,096,873 B2
(45) Date of Patent: *Jan. 17, 2012

(54) METHODS AND APPARATUS FOR MANAGING AN ACCOUNT TO FUND BENEFITS FOR A PLAYER

(75) Inventors: Jay W. Walker, Ridgefield, CT (US); James A. Jorasch, Stamford, CT (US); Stephen C. Tulley, Fairfield, CT (US); Geoffrey M. Gelman, Stamford, CT (US); Magdalena M. Fincham, Norwalk, CT (US)

(73) Assignee: IGT, Reno, NV (US)

( * ) Notice: Subject to any disclaimer, the term of this patent is extended or adjusted under 35 U.S.C. 154(b) by 737 days.

This patent is subject to a terminal disclaimer.

(21) Appl. No.: 12/190,984

(22) Filed: Aug. 13, 2008

(65) Prior Publication Data

US 2008/0300051 A1 Dec. 4, 2008

Related U.S. Application Data

(62) Division of application No. 10/395,621, filed on Mar. 21, 2003, now Pat. No. 7,416,485.

(60) Provisional application No. 60/373,747, filed on Apr. 18, 2002.

(51) Int. Cl.
*A63F 9/24* (2006.01)
*A63F 13/00* (2006.01)

(52) U.S. Cl. ................ 463/25; 463/16; 463/17; 463/18; 463/19; 463/20

(58) Field of Classification Search .............. 463/16–20, 463/25
See application file for complete search history.

(56) References Cited

U.S. PATENT DOCUMENTS

| | | | | |
|---|---|---|---|---|
| 5,655,961 | A | 8/1997 | Acres et al. | |
| 6,001,016 | A | 12/1999 | Walker et al. | |
| 6,015,344 | A | 1/2000 | Kelly et al. | |
| 6,319,125 | B1 * | 11/2001 | Acres | 463/25 |
| 6,726,563 | B1 | 4/2004 | Baerlocher et al. | |
| 6,857,958 | B2 | 2/2005 | Osawa | |
| 6,910,964 | B2 | 6/2005 | Acrres | |
| 7,416,485 | B2 * | 8/2008 | Walker et al. | 463/25 |
| 7,682,244 | B1 | 3/2010 | Luciano, Jr. et al. | |
| 2002/0077167 | A1 * | 6/2002 | Merari | 463/13 |
| 2008/0220851 | A1 | 9/2008 | Glavich et al. | |

* cited by examiner

*Primary Examiner* — Peter DungBa Vo
*Assistant Examiner* — Jasson Yoo
(74) *Attorney, Agent, or Firm* — K&L Gates LLP

(57) ABSTRACT

In accordance with one or more embodiments, an account is established for a player of a gaming device. The balance of the account is increased if a predetermined condition is satisfied. An example of a condition the satisfaction of which may result in an increase in the balance is a player's obtainment of an outcome that corresponds to both (i) a first payout that is displayed on a payout schedule of the gaming device, and (ii) an amount by which the balance of the account is to be increased. Disbursements from the account may be made if a predetermined condition is satisfied. A disbursement may be in the form of a payout, bonus, or other benefit. An example of a condition the satisfaction of which may result in a disbursement is the obtainment by the player of a predetermined number of consecutive non-winning outcomes. Thus, in one or more embodiments, currency may be accumulated for a player during a gaming session of the player and utilized to fund payouts provided to the player at times in which the player may be becoming discouraged and contemplating discontinuation of play of the gaming device.

6 Claims, 20 Drawing Sheets

600

| RANDOM NUMBER 610 | OUTCOME 620 |
|---|---|
| 00001 | 7 / 7 / 7 |
| 00002 | NON-WINNING |
| 00003 | ANY / ANY / CHERRY |
| 00004 | NON-WINNING |
| 00005 | NON-WINNING |
| 00006 | ANY / ANY / CHERRY |
| ⋮ | ⋮ |
| 00112 | BAR / BAR / BAR |
| 00113 | NON-WINNING |
| 00114 | ANY / ANY / CHERRY |
| 00115 | NON-WINNING |
| 00116 | NON-WINNING |
| 00117 | BAR / PLUM / PLUM |
| ⋮ | ⋮ |
| 03456 | BELL / BELL / BELL |
| 03457 | ANY / ANY / CHERRY |
| 03458 | NON-WINNING |
| 03459 | NON-WINNING |
| ⋮ | ⋮ |
| 10647 | ORANGE / ORANGE / ORANGE |
| 10648 | ORANGE / ORANGE / BAR |

PRIOR ART

FIG. 6

700A

R700A-20

R700A-05

R700A-10

| OUTCOME 705A | PAYOUT 710A |
|---|---|
| CHERRY / ANY / ANY | 2 |
| ANY / ANY / CHERRY | 2 |
| CHERRY / CHERRY / ANY | 5 |
| ANY / CHERRY / CHERRY | 5 |
| CHERRY / ANY / CHERRY | 5 |
| CHERRY / CHERRY / CHERRY | 20 |
| BAR / ORANGE / ORANGE | 10 |
| ORANGE / ORANGE / BAR | 10 |
| ORANGE / ORANGE / ORANGE | 20 |
| BAR / PLUM / PLUM | 14 |
| PLUM / PLUM / BAR | 14 |
| PLUM / PLUM / PLUM | 20 |
| BAR / BELL / BELL | 18 |
| BELL / BELL / BAR | 18 |
| BELL / BELL / BELL | 20 |
| BAR / BAR / BAR | 50 |
| 7 / 7 / 7 | 100 |

PRIOR ART

FIG. 7A

700B

| OUTCOME 705B | DISPLAYED PAYOUT 710B | ACTUAL PAYOUT 715B |
|---|---|---|
| CHERRY / ANY / ANY | 1 | 2 |
| ANY / ANY / CHERRY | 2 | 2 |
| CHERRY / CHERRY / ANY | 4 | 5 |
| ANY / CHERRY / CHERRY | 4 | 5 |
| CHERRY / ANY / CHERRY | 5 | 5 |
| CHERRY / CHERRY / CHERRY | 18 | 20 |
| BAR / ORANGE / ORANGE | 10 | 10 |
| ORANGE / ORANGE / BAR | 10 | 10 |
| ORANGE / ORANGE / ORANGE | 20 | 20 |
| BAR / PLUM / PLUM | 12 | 14 |
| PLUM / PLUM / BAR | 14 | 14 |
| PLUM / PLUM / PLUM | 20 | 20 |
| BAR / BELL / BELL | 18 | 18 |
| BELL / BELL / BAR | 18 | 18 |
| BELL / BELL / BELL | 20 | 20 |
| BAR / BAR / BAR | 40 | 50 |
| 7 / 7 / 7 | 95 | 100 |

R700B-10 R700B-15 R700B-20 R700B-25 R700B-30 R700B-35 R700B-40

FIG. 7B

700C

| OUTCOME 705C | DISPLAYED PAYOUT 710C | ADDITIONAL HIDDEN PAYOUT 715C |
|---|---|---|
| CHERRY / ANY / ANY | 1 | 1 |
| ANY / ANY / CHERRY | 2 | 0 |
| CHERRY / CHERRY / ANY | 5 | 0 |
| ANY / CHERRY / CHERRY | 4 | 1 |
| CHERRY / ANY / CHERRY | 5 | 0 |
| CHERRY / CHERRY / CHERRY | 20 | 0 |
| BAR / ORANGE / ORANGE | 10 | 0 |
| ORANGE / ORANGE / BAR | 10 | 0 |
| ORANGE / ORANGE / ORANGE | 20 | 0 |
| BAR / PLUM / PLUM | 12 | 2 |
| PLUM / PLUM / BAR | 14 | 0 |
| PLUM / PLUM / PLUM | 15 | 5 |
| BAR / BELL / BELL | 16 | 2 |
| BELL / BELL / BAR | 17 | 1 |
| BELL / BELL / BELL | 20 | 0 |
| BAR / BAR / BAR | 45 | 5 |
| 7 / 7 / 7 | 90 | 10 |

R700C-10 R700C-15 R700C-20 R700C-25 R700C-30 R700C-35 R700C-40 R700C-45 R700C-50

FIG. 7C

FIG. 8

800

| CONDITION IDENTIFIER 805 | CONDITION DESCRIPTION 810 | AMOUNT OF INCREASE 815 | SOURCE 820 |
|---|---|---|---|
| CI-001 | PLAYER WINS A PAYOUT OF MORE THAN 10 COINS | 2 COINS | PLAYER |
| CI-002 | PLAYER HAS BEEN PLAYING FOR 1 HOUR | 1 COIN IF AVERAGE PLAYER; 2 COINS IF PREMIUM PLAYER;... | 50% PLAYER; 50% CASINO |
| CI-003 | PLAYER EXPERIENCES 15 LOSING SPINS IN A ROW | 1 COIN | CASINO |
| CI-004 | PLAYER EXPERIENCES 5 WINNING SPINS IN A ROW | 2 COINS | PLAYER |
| CI-005 | PLAYER AGREES TO EXTEND HOTEL STAY BY 1 NIGHT | 10 % OF CURRENT ACCOUNT UP TO 15 COINS | CASINO |
| CI-006 | PLAYER INSERTS $100 BILL INTO BILL VALIDATOR | 1 FREE SPIN | CASINO |
| CI-007 | PLAYER INITIATES 200 REEL SPINS WITHIN A 15 MINUTE PERIOD | 20% CHANCE OF ADDING 1 COIN | CASINO |
| CI-008 | PLAYER ANSWERS 10 SURVEY QUESTIONS FROM PHARMACEUTICAL COMPANY AND PROVIDES E-MAIL ADDRESS | 10 COINS | THIRD-PARTY |
| CI-009 | PLAYER AGREES TO PLAY 10 MINUTES ON A MACHINE OF THE SAME MANUFACTURER | 3 COINS | SLOT MACHINE MANUFACTURER |
| CI-010 | OUTCOME CORRESPONDING TO INCREASE GENERATED AND SUM OF PLAYER'S WINNINGS IN PAST 15 MINUTES < 30 COINS | PER PAYOUT TABLE | PLAYER |

R800-10 (rows CI-002, CI-003, CI-004, CI-007, CI-008, CI-010)

900

| CONDITION IDENTIFIER 905 | CONDITION DESCRIPTION 910 | AMOUNT OF DISBURSEMENT 915 |
|---|---|---|
| CD-001 | PLAYER ACTUATES CASH OUT MECHANISM | 100% |
| CD-002 | PLAYER LOSES 10 SPINS IN A ROW | 5 COINS |
| CD-003 | CURRENT TIME IS 19:00 | 2 COINS |
| CD-004 | PLAYER RATE OF PLAY INCREASES 200 HANDLE PULLS WITHIN A 15 MINUTE PERIOD | 40% OF ACCOUNT BALANCE UP TO 3 COINS |
| CD-005 | PLAYER HAS LOST MORE THAN 20 COINS IN PAST 5 MINUTES | COST OF COCKTAIL AND APPETIZER BROUGHT TO PLAYER |
| CD-006 | PLAYER LOST MORE THAN 30 COINS IN 10 MINUTES AND RECEIVED A NEAR MISS OUTCOME | 5 COINS |
| CD-007 | PLAYER REMOVES PLAYER TRACKING CARD | 100% |
| CD-008 | PLAYER RATE OF PLAY DECREASES TO FEWER THAN 50 GAME PLAYS WITHIN 15 MINUTES | 25 BONUS COINS TO BE USED IN 5 MINUTES |

R900-10 R900-15 R900-20 R900-25 R900-30 R900-35

FIG. 9

1000

| PLAYER IDENTIFIER 1010 | NAME 1020 | FINANCIAL ACCOUNT IDENTIFIER 1030 | COMP POINTS 1040 | THEORETICAL WIN / (LOSS) 1050 | ACTUAL WIN / (LOSS) 1060 | ACCOUNT BALANCE 1070 |
|---|---|---|---|---|---|---|
| 1270319 | BOB SMITH | ACCT 99 003 | 4,683 | $3,512 | $4,209 | $0 |
| 11285739 | JIM RED | 5424 5555 8910 3218 VISA - 03/2005 | 376 | $282 | ($87) | $7.52 |
| 41298800 | JOE GREEN | 99 818 5555 | 17,069 | $12,802 | $10,090 | $4.00 |

FIG. 10

1100

| GAMING DEVICE IDENTIFIER 1110 | GAMING DEVICE TYPE 1120 | GAMING DEVICE LOCATION 1130 |
|---|---|---|
| G-10G-3998-42 | VIDEO BLACKJACK | CASINO 1, AREA B-3 |
| G-20-0013-55 | VIDEO POKER | CASINO 1, AREA C-1 |
| G-20-9981-03 | VIDEO POKER | CASINO 1, AREA C-1 |
| G-50-7712-99 | ELECTRONIC REELED SLOT | CASINO 2, AREA B-7 |

R-1102
R-1103
R-1104

FIG. 11

METHODS AND APPARATUS FOR MANAGING AN ACCOUNT TO FUND BENEFITS FOR A PLAYER

This Application is a divisional of application Ser. No. 10/395,621 filed Mar. 21, 2003 in the name of Walker et al and issued as U.S. Pat. No. 7,416,485 on Aug. 26, 2008 and entitled METHODS AND APPARATUS FOR MANAGING AN ACCOUNT TO FUND BENEFITS FOR A PLAYER, which claims the benefit of U.S. Provisional Application Ser. No. 60/373,747 filed Apr. 18, 2002 in the name of Walker et al and entitled GAMING DEVICE METHODS AND APPARATUS EMPLOYING HIDDEN PLAYER ACCOUNTS. The entirety of these related Applications is incorporated by reference herein for all purposes.

The present Application is related to commonly-owned, co-pending U.S. application Ser. No. 10/328,116 filed Dec. 20, 2002 in the name of Walker et al. and entitled METHOD AND APPARATUS FOR OUTPUTTING OUTCOMES OF A GAMING DEVICE. The entirety of this related application is incorporated by reference herein for all purposes.

BACKGROUND

The present invention relates generally to methods and apparatus for outputting bonuses and payouts to a player of a gaming device.

Gaming devices (e.g., reeled slot machines, video poker machines, video keno machines, video blackjack, and video bingo machines) generate more than $15 billion per year in revenue for casinos in the United States alone. This figure accounts for more than half of the gaming revenue for a typical United States casino. The situation is similar in other countries in which gaming devices are popular, such as Australia. Accordingly, casino operators are interested in increasing the enjoyment of playing a slot machine in order to maintain or increase this level of revenue.

Unfortunately, players of gaming devices sometimes become discouraged and discontinue playing. Such discouragement may be due to, for example, a player's failure to obtain any winning outcomes (i.e., outcomes that correspond to payouts) or to qualify for any bonuses during an extended period of time. The discontinuation of play due to discouragement results in a decrease in the profits of casinos and results in players that are not happy with their gaming experience. A casino could attempt to prevent such discouragement by having its gaming devices provide payouts and bonuses more often (e.g., by adjusting the probability of winning such payouts and bonuses). However, consistently providing more frequent payouts and bonuses would result in a decrease in the profit of the casino. Accordingly, casinos may be reluctant to increase the frequency of payouts and bonuses.

For the reasons discussed above, a need exists for a solution to the problem of player discouragement. The solution should be one that minimizes any decrease in profits to the casino and preferably results in an increase in profits of the casino as well as an increase in player's enjoyment of the gaming experience.

BRIEF DESCRIPTION OF THE FIGURES

FIG. 6 is a table illustrating an exemplary data structure of a prior art probability database.

FIG. 7A is a table illustrating an exemplary data structure of a prior art payout database.

FIG. 7B is a table illustrating an exemplary data structure of a payout database consistent with one or more embodiments of the present invention.

FIG. 7C is a table illustrating an exemplary data structure of a payout database consistent with one or more embodiments of the present invention.

FIG. 8 is a table illustrating an exemplary data structure of an account increase conditions database, for use in one or more embodiments of the present invention.

FIG. 9 is a table illustrating an exemplary data structure of an disbursement conditions database, for use in one or more embodiments of the present invention.

FIG. 10 is a table illustrating an exemplary data structure of a player database, for use in one or more embodiments of the present invention.

FIG. 11 is a table illustrating an exemplary data structure of a gaming device database, for use in one or more embodiments of the present invention.

DETAILED DESCRIPTION

Figure 1:
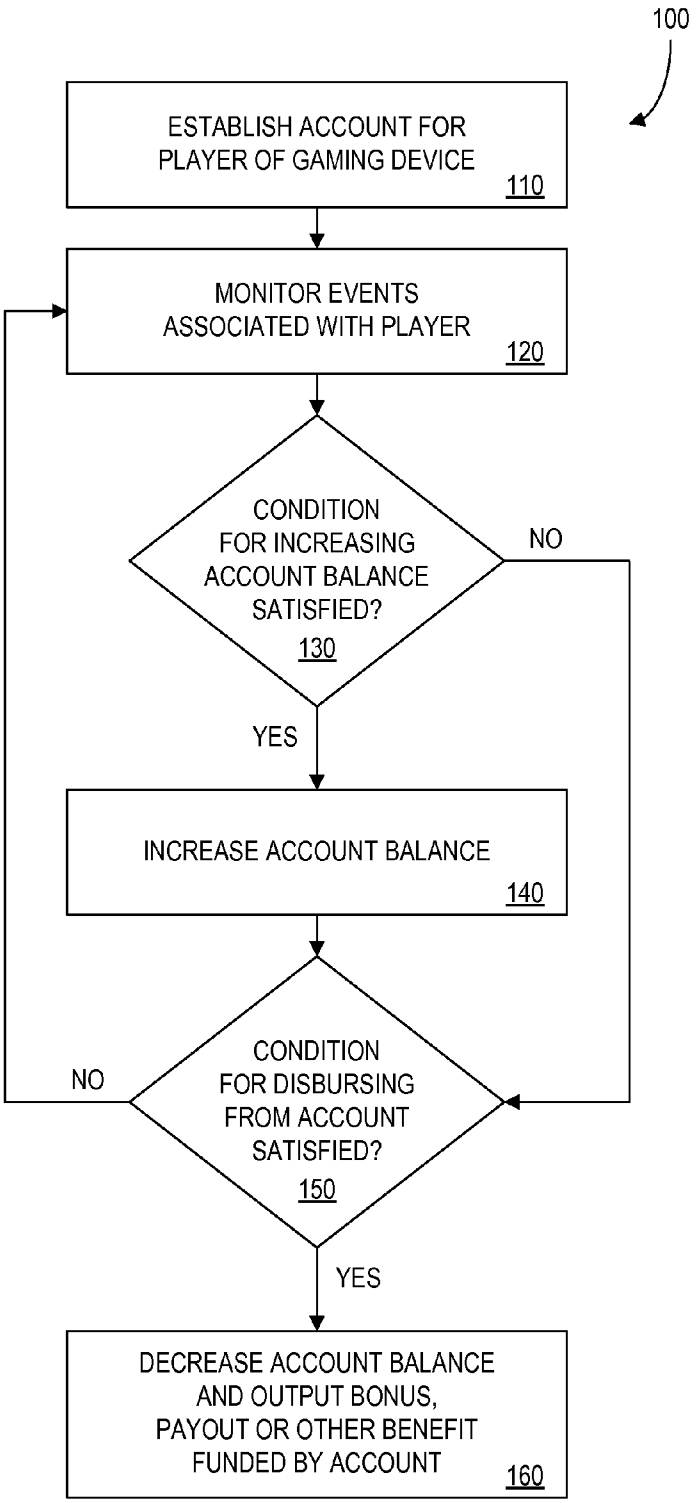
FIG. 1 is a flowchart depicting a process consistent with at least one embodiment of the present invention.

The present invention relates to outputting payouts, bonuses, and other benefits to players of gaming devices. In accordance with one or more embodiments, currency is accumulated for a player in an account and output to the player as bonuses, payouts, and other benefits during the player's play of the gaming device. The bonuses, payouts, or other benefits may be output to the player at times when it is determined that the player is likely to be getting discouraged and in danger of stopping play of the gaming device (e.g., when the player has obtained a predetermined number of consecutive non-winning outcomes and the player's credit meter balance is low).

The term "currency", as used herein unless expressly indicated otherwise, comprises something that is in circulation as a medium of exchange. The term currency includes money (e.g., currency backed by the United States government) as well as alternate currencies like points. That is, alternate currency is a subset of currency.

Alternate currency comprises currency other than money. Examples of alternate currencies include points, credits, tickets, Beenz™, Flooz™, frequent flyer miles, comp points and phone minutes. Note that alternate currencies may be used to purchase products, services, and other consideration in a manner similar to how money is used. The currency accumulated in and disbursed from an account established for the benefit of a player may be money or an alternate currency and may be used in a casino to purchase products, services, and as wagers on gambling activities.

The currency accumulated in the account may be attributed to various sources (i.e., may have been contributed to the account by various sources). In one or more embodiments, the currency in the account may be accumulated based on activities of the player. Thus, the player may be a source of currency in the account (e.g., unbeknownst to the player, as will be described below). For example, a portion of each or some wagers placed by the player may be added to the account. In yet another example, a portion of each or some payouts obtained by the player may be added to the account and temporarily withheld from the player rather than being immediately dispensed to the player. Note that in the latter example, the player may not be informed or aware of the withholding of a portion of a payout. For example, one or more winning outcomes may correspond to a first payout as depicted on a payout schedule output to the player and to a second payout (which is greater than the first payout) as stored in a memory of the gaming device. If the winning outcome is obtained by the player, the player may be provided with the first payout as he expects while the difference between the first payout and the second payout is added to the account.

In another example, a third party may contribute currency (directly or indirectly) to the account and thus be a source of currency in the account. For example, a manufacturer, retailer, marketer, non-profit organization or provider of services may contribute currency to an account of a player in exchange for the player's answering of one or more survey questions or performance of another task. For example, a player may be asked to answer one or more survey questions in exchange for a benefit (e.g. a free game play). Unbeknownst to the player, however, an amount of currency is also associated with the task of answering the survey question (e.g., one coin). Thus, by agreeing to answer or answering the survey question, the player not only obtains the free game play that is the benefit known to the player but also is the unknowing recipient of one coin to the account that has been established for his benefit.

In yet another example, a casino may contribute currency to the account of a player and thus be a source of currency in the account. For example, a casino may contribute a predetermined amount of currency for every predetermined number of game plays initiated by a player (e.g. once a predetermined number of consecutive game plays is initiated by the player) or for every predetermined consecutive amount of time a player plays a gaming device. This currency may be contributed, for example, from a casino's player retention budget.

In yet another example, one or more gaming devices other than a gaming device being played by a player may be a source of currency accumulated in the account established for the benefit of a player. For example, gaming devices linked to the gaming device being played by the player may contribute currency to the account. In another example, breakage from other games (at the gaming device being played by the player or in other gaming devices linked to the gaming device being played by the player) in which players can leave equity may be converted to currency and added to the balance of the account. For example, some slot machines allow a player to accumulate game elements such as slices of a pie. When the pie is completed the player receives a bonus award. Some players leave before the pie is completed. This value left by players could be used to fund accounts of other players.

Further, an account may be established for the benefit of more than one player and thus disbursements from the account may be output to more than one player. For example, all gaming devices at a bank of gaming devices may feed into a single hidden account—with disbursements from the hidden account made to players (e.g., as it is determined that a condition for disbursement has been satisfied with respect to a particular player, a disbursement is made to that player).

In one or more embodiments, the player may not be informed of the existence or ongoing balance of the account. Further, in one or more embodiments, the player may not be able to directly control disbursements from the account. In other words, currency from the account may be disbursed to the player in the form of bonuses or payouts based on rules established by, for example, a casino or gaming device manufacturer rather than based on requests for disbursements made by the player.

The currency may be disbursed from the account and provided to the player as bonuses, payouts, or other benefits without the player's awareness that the bonuses, payouts, or other benefits are funded by the account. A benefit, as used herein unless expressly indicated otherwise, is anything of value to a player. A payout is an example of a benefit. A bonus is another example of a benefit. A payout and a bonus may take the form of an amount of coins or electronic credits that are provided to the player. A difference between a payout and a bonus is that a payout is provided as a result of an outcome for a game play of a primary game while a bonus is provided as a result of a bonus round or result of a bonus feature (also sometimes referred to as a secondary game) of a game play.

The currency may be disbursed from the account when one or more predetermined conditions are satisfied. For example, currency may be disbursed from the account when the player has obtained a predetermined number of consecutive non-winning outcomes or has not obtained a winning outcome for a predetermined period of time. A winning outcome, as used herein, is an outcome that corresponds to a payout greater than a predetermined amount (the predetermined amount typically being zero). In another example, the balance of the account may be disbursed to the player as a seemingly random bonus when the player actuates a cash out mechanism of the gaming device or attempts to withdraw a player tracking card from a player tracking card reader of the gaming device.

The present invention allows a casino or other entity such as an owner, operator, designer, or manufacturer of a gaming device to provide payouts, bonuses or other benefits to a player more often than would otherwise be profitable because the payouts, bonuses, or other benefits are funded by currency contributed to an account from various sources rather than being funded by the one entity that is providing the bonus, payout, or other benefit. Such payouts, bonuses, or other benefits may be provided to the player at times it is determined the player is becoming discouraged and/or intends to stop playing the gaming device.

The existence and/or ongoing balance of the account used to fund such payouts, bonuses, or other benefits may not be disclosed to a player if it is desirable to encourage the player's belief that the payouts, bonuses, or other benefits are being provided in the regular course of game play rather than being funded by an account in which currency has been accumulated for the player over time. It may also be desirable to not disclose the existence and/or ongoing balance of the account to the player because, if the player were aware of the account and/or the balance of the account, the player may be tempted to demand withdrawals from the account, thus depleting the account and making it unavailable to fund payouts, bonuses, or other benefits at times when it would be advantageous to provide them to the player (e.g. when the player has becomes discouraged due to obtaining a predetermined number of consecutive non-winning outcomes).

Note that the term "outcome", as used herein unless otherwise expressly specified, is an indication of the final result of a game play. An outcome typically comprises one or more symbols or alphanumeric characters recognizable by a player. In many games a predetermined set of combinations of symbols each respectively corresponds to a payout. A "payout", as used herein unless expressly indicated otherwise, comprises an output of currency to a player. A payout may be output to a player in the form of tangible coins or tokens (e.g., by being dispensed into from a hopper into a coin tray of a gaming device). Alternately, the output of currency may be in the form of electronic credits, which may be output by being added to a credit meter balance of a player. A "credit meter balance", as used herein unless expressly indicated otherwise, is a balance of electronic credits stored in a gaming device being played by a player and available for wagering on game plays, at the player's discretion. In other words, the player exclusively controls how and when the electronic credits in the credit meter balance are utilized.

The scope of the present invention and embodiments thereof may be understood more fully with reference to the following figures. It should be noted that the embodiments described with reference to the following figures are presented for illustrative purposes only and are not meant to be limiting in any sense. It should also be noted that, as used herein, the terms "an embodiment", "embodiment", "embodiments", "the embodiment", "the embodiments" "one or more embodiments", "some embodiments", and "one embodiment" mean "one or more embodiments" unless expressly specified otherwise. Further, although particular features of the present invention may be described with reference to one or more particular embodiments or figures, it should be understood that such features are not limited to usage in the one or more particular embodiments or figures with reference to which they are described.

Embodiments of the present invention will first be introduced by means of flowcharts that illustrate some basic processes that may be utilized by an entity practicing the present invention. The system infrastructure will then be described with reference to block diagrams of exemplary systems and devices that may be utilized by an entity practicing the present invention. Exemplary data structures illustrating tables that may be used when practicing embodiments of the present invention will then be described, along with corresponding flowcharts that illustrate exemplary processes that utilize the exemplary tables.

Referring now to FIG. 1, a flowchart illustrates a process 100 that is consistent with one or more embodiments of the present invention. The process 100 is a method for funding payouts and bonuses provided to a player from an account established for the player. The process 100, and all other processes described herein unless expressly specified otherwise, may be performed by a gaming device, a computer (e.g., a slot server) in communication with the gaming device, a peripheral device in communication with a gaming device, a peripheral device server and/or a combination thereof. Each of these devices is described in detail below. Further, the process 100, and all other processes described herein unless expressly specified otherwise, may include steps in addition to those expressly depicted in the Figures or described in the specification without departing from the spirit and scope of the present invention. Similarly, the steps of process 100 and any other process described herein, unless expressly specified otherwise, may be performed in an order other than depicted in the Figures or described in the specification, as appropriate.

In step 110 an account is established for the benefit of a player of a gaming device. The account may be established, for example, when a player first initiates a game play at the gaming device (e.g., by placing a wager or actuating a game initiation mechanism such as a handle on a reel slot machine or a "deal" button on a video poker machine). In one or more embodiments, the account may be established when a player initiates a gaming session at a gaming device. In yet other embodiments, an account may be established for a player when the player inserts a player tracking card into the gaming device. In yet other embodiments, an account may be established when a player registers with a casino's slot club and obtains a player tracking card. Other effective points for establishing an account for a player will be recognized by one of ordinary skill in the art after reading Applicants' description of the invention.

A game play, as used herein unless expressly indicated otherwise, is a single attempt by a player to win a prize by playing a game of a gaming device. A game play begins when the player places a wager for the attempt and ends when the final outcome of the attempt is displayed to the player and the gaming device becomes available for the next game play. For example, in a reel slot machine game a game play may begin when the player indicates a wager amount to be placed (e.g., three credits) and ends when the reels stop spinning and the symbols comprising the outcome are displayed along a payline of the gaming device. In games including a bonus round where the player has qualified for the bonus round, a final outcome of an attempt may occur (and thus the game play may end) when the outcome of the bonus round is displayed to the player. In a video poker gaming device, a game play may begin when a player places a wager on the next hand (e.g., by actuating the "Bet 3" button) and may end when the cards comprising the final hand are displayed to the player. In a video poker game that allows a player to re-play an initial hand (e.g. by providing extra payment and changing a decision as to whether to hold or discard a particular card of the initial hand), the game play may end once the second final hand (based on the player's changed decision) is displayed to the player.

A gaming session, as used herein unless expressly indicated otherwise, comprises at least two consecutive game plays played by a player. The initiation of a gaming session, before a player plays at least two consecutive game plays, may be identified or inferred when a player's actions indicate that the player intends to play at least two consecutive game plays at the gaming device. Such actions may comprise, for example, the insertion of a player tracking card into a player tracking card reader of the gaming device or the insertion of currency into the payment system of gaming device in an amount sufficient to fund at least two game plays.

Note that, in accordance with some embodiment of the present invention, an account that is established for the benefit of a player at the initiation of a game play or a gaming session will only be active until the player stops playing the gaming device. In such embodiments, any currency accumulated in the account established for the benefit of the player that has not yet been disbursed to the player during game play may not be stored in association with the player for use the next time the player begins playing a gaming device or otherwise utilized by the gaming device or casino. Alternatively, such accumulated and non-disbursed currency may be stored in association with the player (e.g., in association with the player identifier in the player database) and added to the next account established for the player when the player begins playing at another gaming device. In yet another alternate embodiment, an account for funding bonuses, payouts, and other benefits may be established for the player when the player first registers with the casino's slot club (rather than a new account being established for the player each time the player plays a gaming device), with an ongoing balance being maintained in the account. In this latter embodiment, any currency accumulated for the player but not yet disbursed to the player may remain in the account and be used for the benefit of the player the next time the player plays a gaming device while using his player tracking card.

An entity that implements embodiments of the present invention may find it desirable to disburse the balance of an account to the player for whose benefit the account was established before the player walks away from the gaming device. In other words, an entity that implements embodiments of the present invention may find it desirable to refrain from storing any balance of the account in association with the player and may be reluctant to use any balance remaining in the account for purposes other than to provide payouts, bonuses or other benefits to the player for whose benefit the account was established. However, it may be difficult for the entity to determine that a player is about to walk away from the gaming device before the player actually does so, thereby depriving the entity of the opportunity to disburse any remaining balance of the account to the player. Accordingly, an entity may elect to only establish an account as described in the present invention for certain players. For example, an entity may elect to establish an account for players that are also guests of the casino in which the gaming device being played is located. This may be because, if the player is also a guest, the entity may assure itself of an opportunity to disburse the player with any remaining balance in the account to the player in some form (e.g., as "free" casino tokens provided to the player by casino personnel, as a discount on the player's hotel bill, etc.) if the player walks away from the gaming device while there is still a balance remaining in the account. For a similar reason, an entity may elect to only establish an account for players that insert a player tracking card into the gaming device (since the casino has information about the player that enable it to locate the player and provide him a bonus in some form at a later point in time).

Even if a player does not insert a player tracking card into the gaming device, an entity may elect to establish an account only for a player that inserts an amount of funds into the gaming device sufficient to fund at least two game plays. In the latter embodiment, the entity may further elect to only maintain the balance (i.e., not disburse the remainder as, for example, a bonus to the player) as long as the amount shown by the credit meter of the gaming device remains large enough to fund at least one additional game play besides the one currently being initiated by the player. This may be because the entity may rest assured that the player is highly unlikely to walk away from the gaming device without first actuating the cash out mechanism of the gaming device, thus clearly signaling the player's intention to walk away from the gaming device and providing the gaming device an opportunity to disburse all or a portion of the remaining balance to the player.

Note that, if it is determined that a player may be about to walk away from a gaming device when there is still a balance remaining in the account established for the benefit of the player (e.g. when the balance of the credit meter is insufficient for a subsequent game play or the player has actuated a cash out button or removed his player tracking card), a portion or all of the remaining balance of the account may be disbursed to the player. For example, the remainder of the balance may be disbursed to the player via a payout or as a bonus (e.g., as the player is informed that he has qualified for a "departure bonus as a thank you for playing with us"). Alternately, a portion of the balance may be output to the player in the form of a payout or bonus to tempt the player into remaining at the gaming device and continuing play of the gaming device. In the latter embodiment, if the player continues to signal his intent to walk away from the gaming device (e.g., by again actuating the cash out mechanism), the remainder of the balance may then be disbursed to the player as a bonus (e.g., a second bonus, if the first disbursement had been in the form of a bonus).

An account that is established for a player may be stored and maintained at (i) the gaming device the player is playing, (ii) a peripheral device in communication with the gaming device, (iii) a peripheral device server in communication with the peripheral device that is in communication with the gaming device, (iv) the computer 210, and/or (v) a combination thereof. Storing and maintaining the account means storing an indication of an ongoing balance of the account, including adding amounts to the account when the player's activities meet a condition that entitles the player to an increase in the account and subtracting amounts from the account based on disbursements made to the player that are funded by the account.

Note that storing and maintaining the account does not mean monitoring events associated with the player (e.g., wagers placed by the player, outcomes generated by the gaming device being played by the player) to determine whether a predetermined condition for increasing or decreasing the balance of the account has been satisfied. Step 120 comprises monitoring events associated with a player to determine whether a condition for increasing a balance of the account and/or a condition for making a disbursement from the account to fund a bonus and/or payout to the player has been satisfied.

The monitoring of events associated with the player to determine whether one or more such conditions have been satisfied may or may not be performed by the same device that stores and maintains the account. For example, a gaming device the player is playing may both (i) store and maintain the account, and (ii) monitor events associated with the player to determine whether one or more conditions have been satisfied. In another example, a gaming device may store and maintain the account while the computer 210 may monitor events associated with the player to determine whether one or more conditions have been satisfied. Once the computer 210 determines that one or more conditions have been satisfied, the computer 210 may direct the gaming device to (i) increase the balance of the account (e.g., if a condition for increasing the balance has been satisfied by the occurrence of one or more events associated with the player), (ii) decrease the balance of the account (e.g., if a condition for decreasing the balance of the account has been satisfied by the occurrence of one or more events associated with the player), and/or (iii) output a message to the player. In directing the computer 210 to decrease the balance of the account, the computer 210 may further direct the gaming device to output an outcome and corresponding payout and/or a bonus to the player.

Note that, in embodiments where one device is monitoring events associated with a player to determine whether one or more conditions have been satisfied, that device may be aided by another device by receiving signals indicative of the occurrence of one or more events or by polling the other device to determine whether one or more events has occurred. For example, if computer 210 is monitoring events associated with the player to determine whether one or more conditions that relate to outcomes generated by the gaming devices have been satisfied, it may receive signals or poll one or more gaming devices to determine what outcomes have been generated by the gaming devices.

Events associated with a player may comprise activities associated with the player for which the account has been established. For example, an event may comprise the placement of a wager by the player.

Events associated with a player may comprise events that occur in response to or that are otherwise caused by activities of the player. For example, an event may comprise an outcome generated by a gaming device in response to the initiation of a game play by the player.

Events associated with a player may comprise events occurring at or near the player. This includes events occurring at the gaming device which the player is playing as well as events at other devices that are located in the vicinity of the gaming device the player is playing or are otherwise associated with the player (e.g., devices being played by other players associated with the player, such as friends or family members of the player).

Figure 3A:
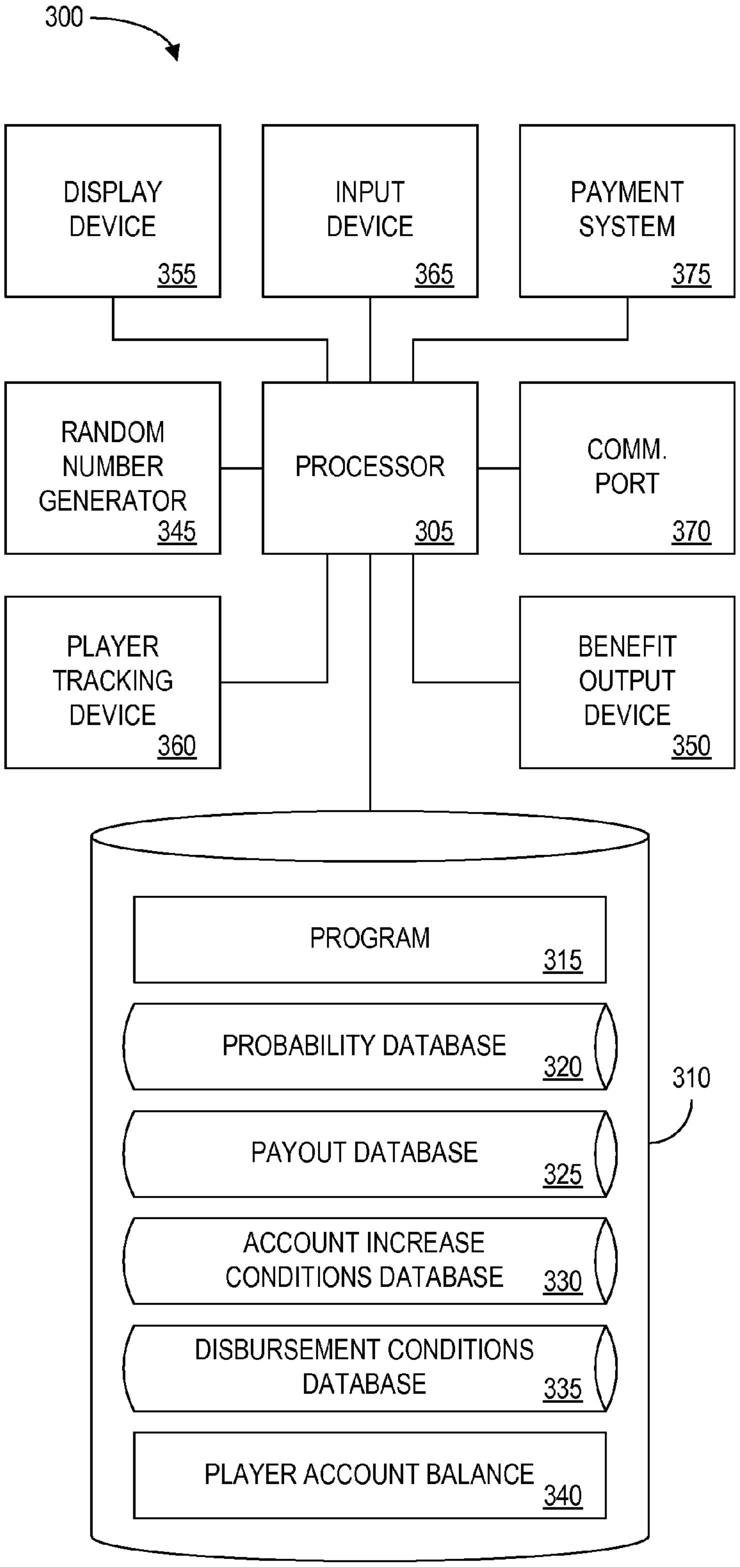
FIG. 3A is a block diagram of a gaming device that may be part of the system of FIG. 2A and the system of FIG. 2B, consistent with at least one embodiment of the present invention.

In step 130 it is determined whether a condition for increasing the balance of the account has been satisfied. Such a determination may comprise, for example, determining whether one or more conditions stored in memory have been satisfied. Such conditions may be stored, for example, in a database such as the account increase conditions database 330 (FIG. 3A). Examples of conditions that may be stored in such a database are described in detail below, with respect to FIG. 8. Step 130 may comprise, for example, determining that a predetermined outcome has been obtained by the player, where the predetermined outcome corresponds to an amount to be added to the account of the player as well as a payout to be provided to the player.

Conditions for increasing the balance of the account may be set by a variety of entities. For example, the casino in which the gaming device is located may set one or more such conditions. In another example, another owner or operator of the gaming device may set one or more conditions. In yet another example, the manufacturer, designer, and/or distributor of the gaming device may set one or more conditions. In embodiments where a third party such as a manufacturer, retailer, marketer, provider of services, or non-profit organization is contributing currency to the account, that third party may set (e.g. with the approval of the casino) one or more such conditions. The entities that may set such conditions may also modify and/or delete such conditions by, for example, accessing (or directing someone who has access to) the memory in which such conditions are stored.

If it is determined, in step 130, that a condition for increasing the balance of the player's account has been satisfied, the process 100 continues to step 140, where the balance of the account is increased. Step 140 may comprise, for example, increasing the balance of the account by a predetermined amount stored in a memory. For example, a gaming device may be programmed to increase the balance of an account associated with a player by a predetermined amount regardless of which condition has been satisfied. In another embodiment, a condition for increasing the balance of an account may correspond to a particular amount that the account is to be increased by. In such an embodiment step 140 may comprise determining the amount corresponding to the particular condition that has been satisfied and increasing the balance of the account by that amount. In yet another embodiment, the amount by which the balance of the account is to be increased may be based, at least partly, on information associated with the player playing the gaming device. For example, the account may be increased by a first amount if the player is a frequent player of gaming devices in the casino and a second (e.g., larger) amount if the player is a first-time or infrequent player of gaming devices in the casino. In yet another embodiment, the amount that the account is to be increased by may be based on information associated with the gaming device and/or casino in which the gaming device is located (e.g., how many gaming devices in the casino are actively being played, how often the gaming device has been played in the last week).

Once the balance of the account is increased in step 140, the process 100 continues to step 150, where it is determined whether a condition for disbursing currency from the account has been satisfied. Note that, if it had been determined in step 130 that a condition for increasing the balance of the account had not been satisfied, the process 100 would have continued from step 130 directly to step 150. Satisfaction of a condition for disbursing currency from the account means that the player has qualified for a payout, bonus, or other benefit to be funded by the currency in the account. For example, it may be determined that the player has not obtained a winning outcome in a predetermined amount of time (e.g., in the last fifteen minutes) and thus should be provided with a payout, bonus, or other benefit. A condition for disbursing currency from the account may be stored in a memory (e.g., a memory of the gaming device being played by a player or a peripheral device in communication with such a gaming device). In one embodiment, a database may store a plurality of such conditions. Tabular representation 900 (FIG. 9, described below) illustrates an embodiment of such a database.

Step 150 may also comprise determining the amount that is to be disbursed from the account based on the satisfaction of the disbursement condition. In one or more embodiments, a particular disbursement amount or instruction of how to arrive at a disbursement amount (e.g. a formula) may be stored in association with each of the conditions in such a database. In such an embodiment, the disbursement amount may be retrieved from the database based on the condition that has been satisfied. In another embodiment, a gaming device or other device (e.g., computer 400 or a peripheral device) may store a disbursement amount or instruction of how to arrive at a disbursement amount (e.g., a formula) that applies regardless of what condition has been satisfied.

In accordance with one or more embodiments, a benefit other than a payout or bonus may be funded by a disbursement from the account established for the benefit of a player. Such a benefit may comprise, for example, a tangible item such as a product, cocktail, appetizer, admission ticket to a hotel event, or a non-negotiable token (e.g., a token that cannot be redeemed for value but that is paid with real currency when wagered with an equal amount of currency). For example, a waitress could be directed to bring a cocktail and/or appetizer to a player who has not obtained a winning outcome in a predetermined amount of time, in an attempt to make the player more comfortable and willing to keep playing the gaming device. In such an embodiment, the cost of such a benefit may be determined to be the disbursement amount to be deducted from the account established for the benefit of a player.

Alternatively, a benefit may comprise an intangible benefit such as additional comp points added to a player's slot club account, free (or discounted) game plays on a gaming device, a room upgrade, a video (e.g., played on a display device of a gaming or peripheral device), an MP3™ audio file, a wildcard (e.g., a card that, when inserted into a gaming device, doubles any jackpot obtained in the next hour), and a code (e.g., that provides access to a bonus feature or extra payline). For example, a player may be informed that, for the next fifteen minutes, any comp points that would normally be earned by the player while playing the gaming device will be tripled by the casino. In another example, a player may be informed that he has "won" five free game plays or that the casino will add two coins to each 1 coin wagered by the player for the next five games, thus allowing the player to bet the maximum amount without providing the entire maximum bet amount himself. The costs of such intangible benefits (e.g. the cost of the five free games) may be determined to be the disbursement amount that is to be deducted from the account established for the benefit of the player.

Conditions for disbursing currency from the account may be set by a variety of entities. For example, the casino in which the gaming device is located may set one or more such conditions. In another example, another owner or operator of the gaming device may set one or more conditions. In yet another example, the manufacturer, designer, and/or distributor of the gaming device may set one or more conditions. In embodiments where a third party such as a manufacturer, retailer, marketer, provider of services, or non-profit organization is contributing currency to the account, that third party may set (e.g., with the approval of the casino) one or more such conditions.

Once it is determined, in step 150, that a condition for disbursing an amount of currency from the account established for the benefit of the player has been satisfied, the process 100 continues to step 160. In step 160 the account is decreased by the disbursement amount.

Step 160 (or an additional step of process 100) may further comprise causing the payout, bonus, or other benefit to be provided to the player. For example, a gaming device, peripheral device, or component thereof may be directed to display an outcome that corresponds to a payout equivalent to the disbursement amount and to output the payout to the player. Alternatively, a gaming device, peripheral device, or component thereof may be directed to enable a bonus round or feature and to produce a result of the bonus round or feature that corresponds to a bonus amount equivalent to the disbursement amount. In yet another alternative embodiment, a casino employee (e.g., a waitress or slot manager) may be directed to approach the player with a particular product or other prize funded by the account (e.g., a cocktail and appetizer). In yet another alternate embodiment, a gaming device, peripheral device, or component thereof may be directed to display a message to the player, informing the player of a benefit available to the player (e.g., a number of free game plays). In the latter embodiment, a gaming device, peripheral device, or component thereof may further be directed to provide the benefit to the player (e.g. enable the gaming device to provide the number of game plays to the player without requiring the player to pay for the spins).

Systems and Apparatus

Figure 2A:
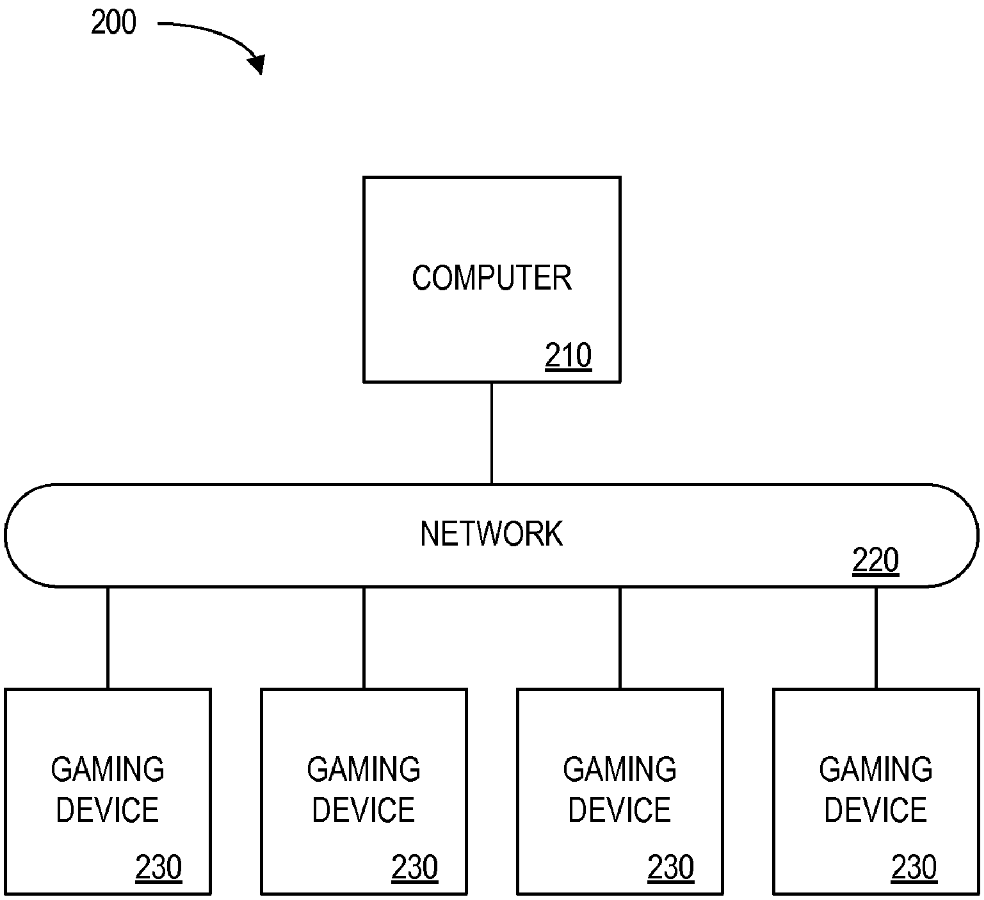
FIG. 2A is a block diagram of a system consistent with at least one embodiment of the present invention.

Referring now to FIG. 2A, a block diagram of a system 200 according to at least one embodiment of the present invention includes a computer 210 (e.g. a slot server of a casino) that is in communication, via a communications network 220, with one or more gaming devices 230 (e.g. slot machines, video poker machines). The computer 210 may communicate with the devices 230 directly or indirectly, via a wired or wireless medium such as the Internet, LAN, WAN or Ethernet, Token Ring, or via any appropriate communications means or combination of communications means. Each of the gaming devices 230 may comprise computers, such as those based on the Intel® Pentium® processor, that are adapted to communicate with the computer 210. Any number and type of gaming devices 230 may be in communication with the computer 210.

Communication between the gaming devices 230 and the computer 210, and among the gaming devices 230, may be direct or indirect, such as over the Internet through a Web site maintained by computer 210 on a remote server or over an on-line data network including commercial on-line service providers, bulletin board systems and the like. In yet other embodiments, the gaming devices 230 may communicate with one another and/or computer 210 over RF, cable TV, satellite links and the like.

Some, but not all, possible communication networks that may comprise network 220 or be otherwise part of system 200 include: a local area network (LAN), a wide area network (WAN), the Internet, a telephone line, a cable line, a radio channel, an optical communications line, a satellite communications link. Possible communications protocols that may be part of system 200 include: Ethernet (or IEEE 802.3), SAP, ATP, Bluetooth™, and TCP/IP. Communication may be encrypted to ensure privacy and prevent fraud in any of a variety of ways well known in the art.

Those skilled in the art will understand that devices in communication with each other need not be continually transmitting to each other. On the contrary, such devices need only transmit to each other as necessary, and may actually refrain from exchanging data most of the time. For example, a device in communication with another device via the Internet may not transmit data to the other device for weeks at a time.

In an embodiment, the computer 210 may not be necessary and/or preferred. For example, the present invention may, in one or more embodiments, be practiced on a stand-alone gaming device 230 and/or a gaming device 230 in communication only with one or more other gaming devices 230. In such an embodiment, any functions described as performed by the computer 210 or data described as stored on the computer 210 may instead be performed by or stored on one or more gaming devices 230.

Figure 2B:
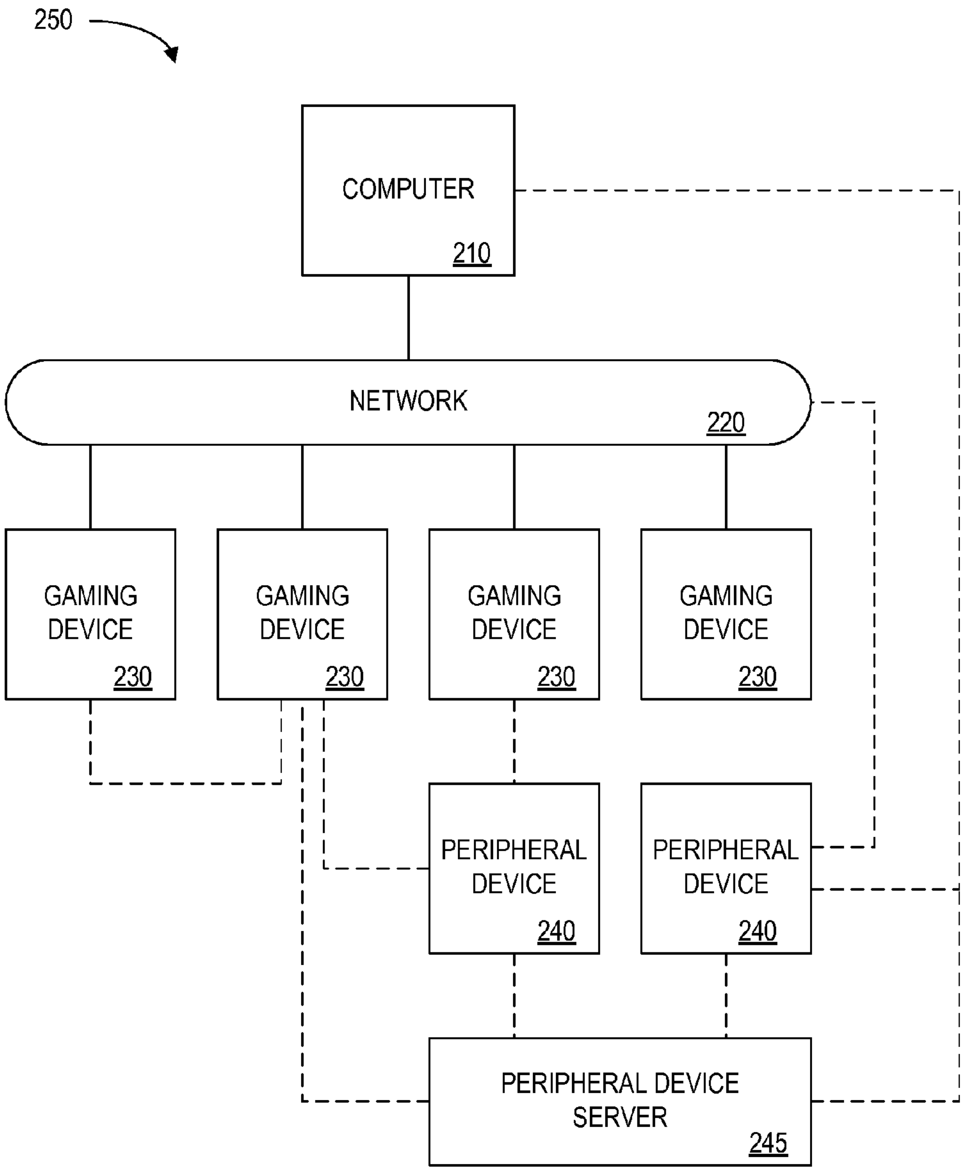
FIG. 2B is a block diagram of another system consistent with at least one embodiment of the present invention.

Referring now to FIG. 2B, a block diagram of another system 250 according to at least one embodiment of the present invention includes a computer 210 (e.g. a slot server of a casino) that is in communication, via a communications network 220, with one or more gaming devices 230 (e.g. slot machines, video poker machines). A difference between system 200 (FIG. 2A) and system 250 (FIG. 2B) is that in system 250 at least one gaming device 230 is also in communication with one or more peripheral devices 240. A peripheral device 240 may, in turn, be in communication with a peripheral device server 245 and, in some embodiments, with computer 210. In one or more embodiments the peripheral device server 245 may be in communication with one or more gaming devices 240 and/or computer 210.

The computer 210 may communicate with the devices 230 and devices 240 directly or indirectly, via a wired or wireless medium such as the Internet, LAN, WAN or Ethernet, Token Ring, or via any appropriate communications means or combination of communications means. For example, the computer 210 may communicate directly with one of the gaming devices 230 (e.g., via a LAN) and indirectly (e.g., via a gaming device 230) with a peripheral device 240. In another example, the computer 210 may communicate with one of the gaming devices 230 via a LAN and with another of the gaming devices 230 via the Internet (e.g., if the particular gaming device comprises a personal computer in communication with an online casino).

Each of the devices 230 and the devices 240 may comprise computers, such as those based on the Intel® Pentium® processor, that are adapted to communicate with the computer 210. Further, each of the devices 230 may comprise a gaming device such as a mechanical or electronic slot machine, a video poker machine, a video blackjack machine, a video keno machine, a pachinko machine, a video roulette machine, and/or a lottery terminal. Further yet, each of the devices 240 may comprise an external or internal module associated with one or more of the gaming devices 230 that is capable of communicating with one or more of the gaming devices 230 and of directing the one or more gaming devices 230 to perform one or more functions. Any number of devices 230 may be in communication with the computer 210. Any number and type of peripheral devices 240 may be in communication with a gaming device 230, peripheral device server 245 and computer 210.

Communication between the devices 230 and the computer 210, between the devices 230 and devices 240, between peripheral device server 245 and the devices 240 and/or the devices 230, between the peripheral device server 245 and computer 210, among the devices 230, and among the devices 240 may be direct or indirect, such as over the Internet through a Web site maintained by computer 210 on a remote server or over an on-line data network including commercial on-line service providers, bulletin board systems and the like. In yet other embodiments, any and all of the devices of system 250 (i.e., the devices 230, the devices 240, the computer 210, and the peripheral device server 245) may communicate with one another over RF, cable TV, satellite links and the like.

Some, but not all, possible communication networks that may comprise network 220 or otherwise be part of system 250 include: a local area network (LAN), a wide area network (WAN), the Internet, a telephone line, a cable line, a radio channel, an optical communications line, a satellite communications link. Possible communications protocols that may be part of system 250 include: Ethernet (or IEEE 802.3), SAP, ATP, Bluetooth™, and TCP/IP. Communication may be encrypted to ensure privacy and prevent fraud in any of a variety of ways well known in the art.

In an embodiment, the computer 210 may not be necessary and/or preferred. For example, the present invention may, in one or more embodiments, be practiced on a stand-alone gaming device 230, one or more gaming devices in communication with one or more peripheral devices 240, one or more gaming devices in communication with peripheral device server 245, one or more peripheral devices 240 in communication with peripheral device server 245, and/or a gaming device 230 in communication only with one or more other gaming devices 230. In such an embodiment, any functions described as performed by the computer 210 or data described as stored in a memory of the computer 210 may instead be performed by or stored on one or more gaming devices 230, one or more peripheral devices 240, and/or peripheral device server 245.

Similarly, peripheral device server 245 may not be desired and/or needed in some embodiments of the present invention. In embodiments that do not involve peripheral device server 245, any or all of the functions described herein as being performed by peripheral device server 245 may instead be performed by computer 210, one or more gaming devices 230, one or more peripheral devices 240, or a combination thereof. Similarly, in embodiments that do not involve peripheral device server 245 any data described herein as being stored in a memory of peripheral device server 245 may instead be stored in a memory of computer 210, one or more gaming devices 230, one or more peripheral devices 240, or a combination thereof.

Any or all of the gaming devices 230 may, respectively, include or be in communication with a peripheral device 240. A peripheral device 240 may be a device that obtains (e.g., receives or reads) information from (and/or transmits information to) one or more gaming devices 230. For example, a peripheral device 240 may be operable to obtain information about games being played on a gaming device 230, such as the initiation of a game and/or a random number that has been generated for a game. For example, a peripheral device 240 may monitor activities carried out by a processor of a gaming device 230.

In one or more embodiments, one or more such peripheral devices 240 may be in communication with a peripheral device server 245. This allows the peripheral device server 245 to receive information regarding a plurality of games being played on a plurality of gaming devices 230. The peripheral device server 245, in turn, may be in communication with the computer 210. It should be understood that any functions described herein as performed by a peripheral device 240 may also or instead be performed by the peripheral device server 245. Similarly, any data described herein as being stored on or accessed by a peripheral device 240 may also or instead be stored on or accessed by the peripheral device server 245.

A peripheral device 240 may be operable to access a database (e.g. of peripheral device server 245) to provide benefits (e.g., cashless gaming receipts) based on, for example, an actual outcome of a game. A peripheral device 240 may also be operable to access a database (e.g., a character database, as described in more detail below) to determine which animated character to use when outputting an apparent and/or actual outcome of a game on a gaming device.

The peripheral device server 245 may also monitor player gambling history over time by associating gambling behavior with player identifiers, such as player tracking card numbers. For example, in embodiments wherein a player selects which character is to be displayed, the peripheral device server 245 may track which character the player previously selects and subsequently use that information to present other offers to the player and/or to output other outcomes to the player. Further, information about the player obtained or accessed by peripheral device server 245 may be analyzed, e.g., to identify those players that a particular gaming machine owner, operator, or manufacturer finds most desirable. Based upon desired objectives, the peripheral device server 245 may direct the appropriate peripheral device 240 to issue customized messages to specific players that are relevant to their gambling behaviors.

Information received by a peripheral device 240 from a gaming device 230 may include gambling data such as number of games initiated per unit of time, outcomes displayed for games initiated, payouts corresponding to outcomes displayed, a credit meter balance of the gaming device, and/or data associated with the player currently playing the gaming device 230.

The functions described herein as being performed by a peripheral device server 245 and/or a peripheral device 240 may, in one or more embodiments, be performed by the computer 210 (in lieu of or in conjunction with being performed by a peripheral device server 245 and/or a peripheral device 240). Such functions may be performed by computer 210 in either system 200 (FIG. 2A) or system 250 (FIG. 2B).

In one or more embodiments, a peripheral device 240 may be useful for implementing the embodiments of the present invention into the operation of a conventional gaming device. For example, in order to avoid or minimize the necessity of modifying or replacing a program already stored in a memory of a conventional gaming device, an external or internal module that comprises a peripheral device 240 may be inserted in or associated with the gaming device. For example, a conventional gaming device may be retrofitted with a peripheral device 240 in order to implement one or more embodiments of the present invention.

Thus, for example, a peripheral device 240 may be utilized to monitor play of the gaming device and output messages and an outcome of a game. In such embodiments the gaming device 230 with which the peripheral device 240 is in communication may continue to operate conventionally. In such embodiments the gaming device 230 may continue to output outcomes, payouts, and bonuses for each game played. The peripheral device 240, however, may output additional outcomes, payouts and/or bonuses to a player when appropriate. The peripheral device 240 may also output messages to the player (e.g., such as "Hold on! You've the lucky winner of a Super Bonus!"). The peripheral device 240 may also provide benefits to a player (e.g., coins, tokens, electronic credits, paper receipts exchangeable for cash, services, and/or merchandise).

Accordingly, a peripheral device 240 may include (i) a communications port (e.g., for communicating with one or more gaming devices 230, peripheral device server 245, another peripheral device 240, and/or computer 210); (ii) a display (e.g., for displaying messages and/or outcomes), (iii) another output means (e.g., a speaker, light, or motion device to communicate with a player), and/or (iv) a benefit providing means (e.g., a printer and paper dispensing means, a credit meter, and/or a hopper and hopper controller).

In one or more embodiments, the peripheral device may not output outcomes, payouts, bonuses and/or messages to a player but may instead direct the processor of a gaming device to perform such functions. For example, a program stored in a memory of peripheral device 240 may cause a processor of a gaming device to perform certain functions. For example, a program stored in a memory of peripheral device 240 may cause a processor of a gaming device to output an outcome, determine an outcome, output a message, access a database, provide a benefit, refrain from providing a benefit (e.g., by not sending a signal to a hopper controller of the gaming device when it otherwise normally would), and/or communicate with another device.

Note that, in one or more embodiments, a gaming device 230 and a peripheral device 240 that is associated with the gaming device 230 may not communicate with one another at all. Each may, however, communicate with a computer or other device. For example, a gaming device 240 may communicate with computer 210 and an associated peripheral device 240 may communicate with peripheral device server 245 and/or computer 210. For example, if both gaming device 230 and peripheral device 240 are in communication with computer 210, each may obtain information associated with the other through computer 210.

Referring now to FIG. 3A, illustrated therein is a block diagram of an embodiment 300 of a gaming device. The gaming device 300 may be implemented as a system controller, a dedicated hardware circuit, an appropriately programmed general-purpose computer, or any other equivalent electronic, mechanical or electro-mechanical device. The gaming device 300 may comprise, for example, a slot machine, a video poker terminal, a video blackjack terminal, a video keno terminal, a video lottery terminal, a pachinko machine or a table-top game. In various embodiments, a gaming device may comprise, for example, a personal computer (e.g., which communicates with an online casino Web site), a telephone (e.g., to communicate with an automated sports book that provides gaming services), or a portable handheld gaming device (e.g. a personal digital assistant or Nintendo GameBoy). The gaming device 300 may comprise any or all of the gaming devices 230 of system 200 (FIG. 2A) or system 250 (FIG. 2B). In some embodiments, a user device such as a PDA or cell phone may be used in place of, or in addition to, some or all of the gaming device 300 components depicted in FIG. 3A. Further, a gaming device may comprise a personal computer or other device operable to communicate with an online casino and facilitate game play at the online casino. In one or more embodiments, the gaming device 300 may comprise a computing device operable to execute software that simulates play of a reeled slot machine game, video poker game, video blackjack game, video keno game, video roulette game, or lottery game.

The gaming device 300 comprises a processor 305, such as one or more Intel® Pentium® processors. The processor 305 is in communication with a memory 310 and a communications port 370 (e.g., for communicating with one or more other devices). The memory 310 may comprise an appropriate combination of magnetic, optical and/or semiconductor memory, and may include, for example, Random Access Memory (RAM), Read-Only Memory (ROM), a compact disc and/or a hard disk. The memory 310 may comprise or include any type of computer-readable medium. The processor 305 and the memory 310 may each be, for example: (i) located entirely within a single computer or other device; or (ii) connected to each other by a remote communication medium, such as a serial port cable, telephone line or radio frequency transceiver. In one embodiment, the gaming device 300 may comprise one or more devices that are connected to a remote server computer for maintaining databases.

The memory 310 stores a program 315 for controlling the processor 305. The processor 305 performs instructions of the program 315, and thereby operates in accordance with the present invention, and particularly in accordance with the methods described in detail herein. The program 315 may be stored in a compressed, uncompiled and/or encrypted format. The program 315 furthermore includes program elements that may be necessary, such as an operating system, a database management system and "device drivers" for allowing the processor 305 to interface with computer peripheral devices. Appropriate program elements are known to those skilled in the art, and need not be described in detail herein.

The term "computer-readable medium" as used herein refers to any medium that participates in providing instructions to processor 305 (or any other processor of a device described herein) for execution. Such a medium may take many forms, including but not limited to, non-volatile media, volatile media, and transmission media. Non-volatile media include, for example, optical or magnetic disks, such as memory 310. Volatile media include dynamic random access memory (DRAM), which typically constitutes the main memory. Transmission media include coaxial cables, copper wire and fiber optics, including the wires that comprise a system bus coupled to the processor 305. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying one or more sequences of one or more instructions to processor 305 (or any other processor of a device described herein) for execution. For example, the instructions may initially be borne on a magnetic disk of a remote computer. The remote computer can load the instructions into its dynamic memory and send the instructions over a telephone line using a modem. A modem local to a gaming device 300 (or, e.g., a computer 210) can receive the data on the telephone line and use an infrared transmitter to convert the data to an infrared signal. An infrared detector can receive the data carried in the infrared signal and place the data on a system bus for processor 305. The system bus carries the data to main memory, from which processor 200 retrieves and executes the instructions. The instructions received by main memory may optionally be stored in memory 310 either before or after execution by processor 305. In addition, instructions may be received via communication port 370 as electrical, electromagnetic or optical signals, which are exemplary forms of carrier waves that carry data streams representing various types of information. Thus, the gaming device 300 may obtain instructions in the form of a carrier wave.

According to an embodiment of the present invention, the instructions of the program 315 may be read into a main memory from another computer-readable medium, such from a ROM to RAM. Execution of sequences of the instructions in program 315 causes processor 305 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software. As discussed with respect to system 250 of FIG. 2B, execution of sequences of the instructions in a program of a peripheral device 240 in communication with gaming device 300 may also cause processor 305 to perform some of the process steps described herein.

The memory 310 also stores a plurality of databases, including a probability database 320, a payout database 325, an account increase conditions database 330, a disbursement conditions database 335. Each of these databases is described in detail below. Note that, although these databases are described as being stored in a gaming device, in other embodiments of the present invention some or all of these databases may be partially or wholly stored in another device, such as one or more of the peripheral devices 240, the peripheral device server 245 and/or the computer 210. Further, some or all of the data described as being stored in the databases 320-335 may be partially or wholly stored (in addition to or in lieu of being stored in the memory 310 of the gaming device 300) in a memory of one or more other devices, such as one or more of the peripheral devices 240, another gaming device 230, the peripheral device server 245 and/or the computer 210.

The databases 220, 225, 230, 235, and 240 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though four separate databases are illustrated, the invention could be practiced effectively using one, two, three, five, or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

The memory 310 also stores an account balance 340. This account balance is updated as currency is added to or disbursed from the account. The account balance may initially be set to zero and increased as conditions are satisfied by events associated with a player and amounts added to the account. In one or more embodiments the casino or another entity may provide an initial predetermined amount of currency (e.g., two coins) to be automatically added to an account when it is first established. Such an initial non-zero balance may be established for each player for whose benefit an account is established or may only be established for a subset of players (e.g., only for premium and/or first-time players). Further, the amount initially added to the balance when the account is first established may vary based on information associated with the player or another factor (e.g. based on the time of day, week, month, or year that the account is established).

In accordance with one or more embodiments, the account balance may also be set to a status of "inactive" and changed to a status of "active" once an account is established for a player (e.g., since, in one or more embodiments, an account is not established for all players who play the gaming device). In such embodiments, the following may only be activated if the status of the account balance is set to active: (i) subroutine(s) for increasing the balance of the account; (ii) subroutine(s) for making disbursements from the account; (iii) subroutine (s) for determining whether one or more conditions for increasing the balance of the account or for making disbursements from the account have been satisfied; and/or (iv) communications with a peripheral device. Thus, for example, the step 110 of process 100 (establishing an account for the benefit of a player) may include changing the status of the account balance from "inactive" to "active".

The processor 305 is also operable to communicate with a random number generator 345, which may be a component of gaming device 300. The random number generator, in accordance with at least one embodiment of the present invention, may generate data representing random or pseudo-random values (referred to as "random numbers" herein). The random number generator may generate a random number every predetermined unit of time (e.g., every second) or in response to an initiation of a game on the gaming device. In the former embodiment, the generated random numbers may be used as they are generated (e.g., the random number generated at substantially the time of game initiation is used for that game) and/or stored for future use.

A random number generator, as used herein, may be embodied as a processor separate from but working in cooperation with processor 305. Alternatively, random number generator may be embodied as an algorithm, program component, or software stored in the memory of gaming device 300 and used to generate a random number.

Note that, although the generation or obtainment of a random number is described herein as involving a random number generator of a gaming device, other methods of determining a random number may be employed. For example, a gaming device owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 305 is also operable to communicate with a benefit output device 350, which may be a component of gaming device 300. The benefit output device 350 may comprise one or more devices for outputting a benefit to a player of the gaming device 300. For example, in one embodiment the gaming device 300 may provide coins and/or tokens as a benefit. In such an embodiment the benefit output device 350 may comprise a hopper and hopper controller, for dispensing coins and/or tokens into a coin tray of the gaming device 300. In another example, the gaming device 300 may provide a receipt or other document on which there is printed an indication of a benefit (e.g. a cashless gaming receipt that has printed thereon a monetary value, which is redeemable for cash in the amount of the monetary value). In such an embodiment the benefit output device 350 may comprise a printing and document dispensing mechanism. In yet another example, the gaming device 300 may provide electronic credits as a benefit (which, e.g. may be subsequently converted to coins and/or tokens and dispensed from a hopper into a coin tray). In such an embodiment the benefit output device 350 may comprise a credit meter balance and/or a processor that manages the amount of electronic credits that is indicated on a display of a credit meter balance. The processor may be the processor 305 or another processor. In yet another example, the gaming device 300 may credit a monetary amount to a financial account associated with a player as a benefit provided to a player. The financial account may be, for example, a credit card account, a debit account, a charge account, a checking account, or a casino account. In such an embodiment the benefit output device may comprise a device for communicating with a server on which the financial account is maintained.

Note that, in one or more embodiments, the gaming device 300 may include more than one benefit output device 350 even though only one benefit output device is illustrated in FIG. 3A. For example, the gaming device 300 may include both a hopper and hopper controller combination and a credit meter balance. Such a gaming device may be operable to provide more than one type of benefit to a player of the gaming device. A single benefit output device 350 may be operable to output more than one type of benefit. For example, a benefit output device 350 may be operable to increase the balance of credits in a credit meter and communicate with a remote device in order to increase the balance of a financial account associated with a player.

The processor 305 is also operable to communicate with a display device 355, which may be a component of gaming device 300. The display device 355 may comprise, for example, one or more display screens or areas for outputting information related to game play on the gaming device, such as a cathode ray tube (CRT) monitor, liquid crystal display (LCD) screen, or light emitting diode (LED) screen.

In one or more embodiments, a gaming device may comprise more than one display device. For example, a gaming device may comprise an LCD display for displaying electronic reels and a display area that displays rotating mechanical reels.

The processor 305 may also be in communication with one or more other devices besides the display device 355, for outputting information (e.g., to a player or another device). Such other one or more output devices may also be components of gaming device 300. Such other one or more output devices may comprise, for example, an audio speaker (e.g. for outputting an actual and/or apparent outcome or information related thereto, in addition to or in lieu of such information being output via a display device 355), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The display device 355 may comprise, for example, one or more display areas. For example, one of the display areas may display outcomes of games played on the gaming device (e.g. electronic reels of a gaming device). Another of the display areas may display rules for playing a game of the gaming device. Yet another of the display areas may display the benefits obtainable by playing a game of the gaming device (e.g., in the form of a payout table). In one or more embodiments, the gaming device 300 may include more than one display device, one or more other output devices, or a combination thereof (e.g., two display devices and two audio speakers).

The processor 305 is also in communication with an input device 365, which is a device that is capable of receiving an input (e.g., from a player or another device) and which may be a component of gaming device 300. An input device may communicate with or be part of another device (e.g. a server, a gaming device, etc.). Some examples of input devices include: a bar-code scanner, a magnetic stripe reader, a computer keyboard or keypad, a button, a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from a second gaming device or a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor.

The processor 305 is also in communication with a payment system 375, which may be a component of gaming device 300. The payment system 375 is a device capable of accepting payment from a player (e.g. a bet or initiation of a balance) and/or providing payment to a player (e.g. a payout). Payment is not limited to currency, but may also include other types of consideration, including products, services, and alternate currencies.

Exemplary methods of accepting payment by the payment system 375 include (i) receiving hard currency (i.e., coins or bills), and accordingly the payment system 375 may comprise a coin or bill acceptor; (ii) receiving an alternate currency (e.g., a paper cashless gaming voucher, a coupon, a non-negotiable token), and accordingly the payment system 375 may comprise a bar code reader or other sensing means; (iii) receiving a payment identifier (e.g. a credit card number, a debit card number, a player tracking card number) and debiting the account identified by the payment identifier; and (iv) determining that a player has performed a value-added activity.

In one embodiment, a player may operate a plurality of gaming devices. For example, a player may simultaneously play two side-by-side gaming devices, a player may play one gaming device (e.g., a gaming device) and then continue his gaming session at another gaming device (e.g. a video poker machine), and a player may remotely operate a gaming device, possibly by using a telephone, PDA or other device (i) to transmit commands (directly or indirectly) to the gaming device, such as wager amounts and commands to select certain cards; and/or (ii) to receive output (directly or indirectly) from the gaming device.

In one embodiment, a gaming device may allow a player to play a game of skill rather than a game of chance. Such an embodiment may be more appealing to certain players or may be permitted in areas where it is illegal to gamble on games of chance.

Figure 3B:
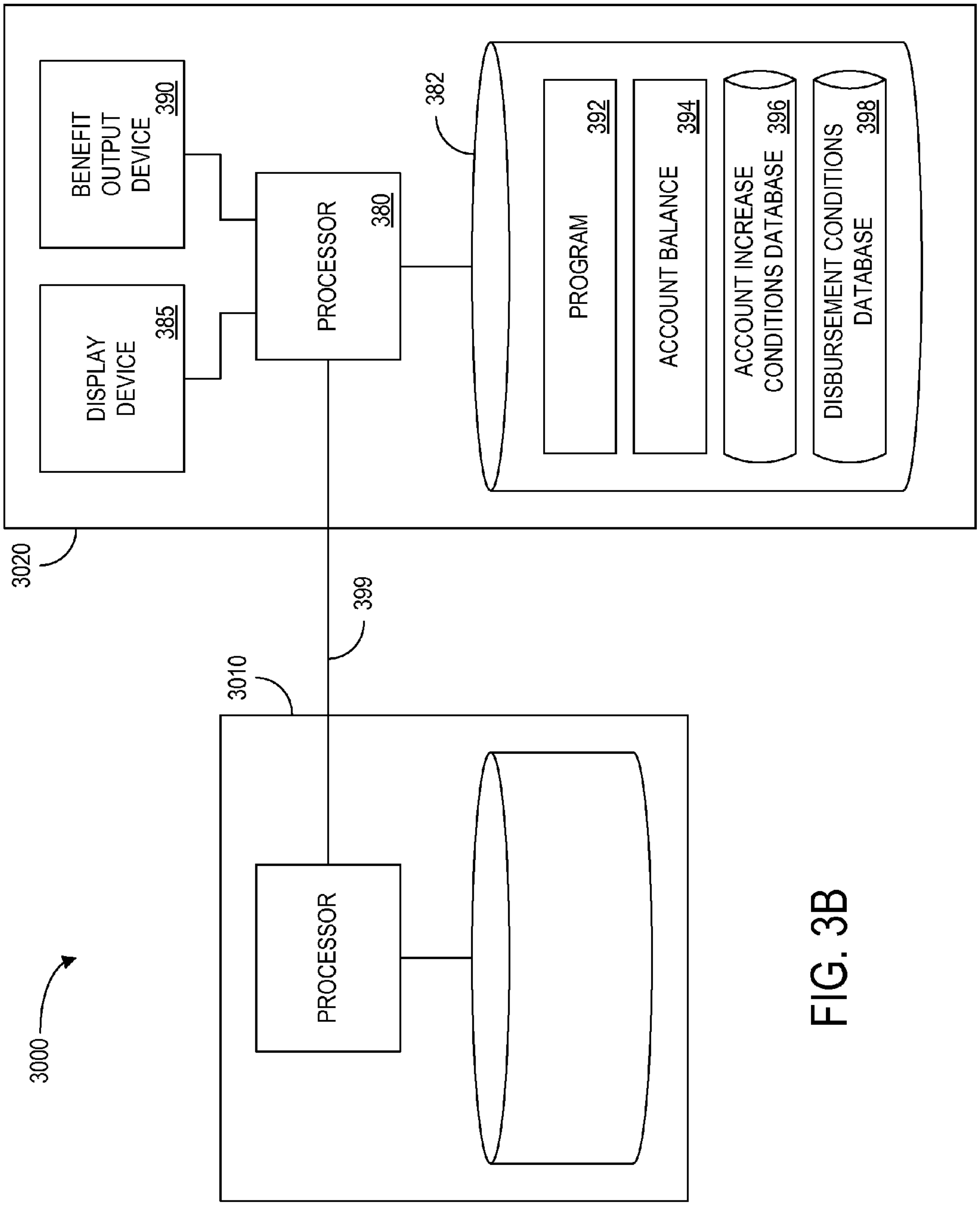
FIG. 3B is a block diagram of a gaming device that may be part of the system of FIG. 2B, wherein the gaming device is in communication with a peripheral device, consistent with at least one embodiment of the present invention.

Referring now to FIG. 3B, illustrated therein is a block diagram of an apparatus 3000 that comprises a gaming device 3010 in communication with a peripheral device 3020. The gaming device 3010 may communicate with the peripheral device 3020 over a network 399. Communication between the gaming device 3010 and the peripheral device 3020 may be direct or indirect, such as over the Internet through a Web site maintained by a computer on a remote server or over an on-line data network including commercial on-line service providers, bulletin board systems and the like. In yet other embodiments, any and all of the devices of apparatus 3000 may communicate with one another over RF, cable TV, satellite links and the like.

Some, but not all, possible communication networks that may comprise network 399 or otherwise be part of system 3000 include: a local area network (LAN), a wide area network (WAN), the Internet, a telephone line, a cable line, a radio channel, an optical communications line, a satellite communications link. Possible communications protocols that may be part of system 3000 include: Ethernet (or IEEE 802.3), SAP, ATP, Bluetooth™, and TCP/IP. Communication may be encrypted to ensure privacy and prevent fraud in any of a variety of ways well known in the art.

The gaming device 3010 may be similar to gaming device 300 (FIG. 3A) and thus include many of the same or similar components and functionality. However, some of the functionality described as being performed by gaming device 300 may not be performed by (or may not exclusively be performed by) gaming device 3010 but may instead or in addition be performed by peripheral device 3020. For example, establishment of an account for a player, determinations of conditions that qualify for increases and/or decreases in the balance of the account, and/or the output of messages regarding payouts or bonuses funded from the account may be performed by peripheral device 3020.

Peripheral device 3020 is an embodiment of a peripheral device 240 (FIG. 2B). Peripheral device 3020 comprises a processor 380 in communication with a display device 385, a benefit output device 390, and a memory 382. Processor 380 may be similar to processor 305 (FIG. 3A) and thus the above description of processor 305 applies to processor 380. Similarly, display device 385 may be similar to the display device 355 and thus the above description of display device 355 applies to display device 385. Further, the benefit output device 390 may be similar to the benefit output device 350 (FIG. 3A) and therefore the description of the benefit output device 350 applies to the benefit output device 390.

The memory 382 may be similar to the memory 310 (FIG. 3A) and thus the description of the memory 310 applies to the memory 382. The memory 382 stores a program 392 for controlling the processor 380. The processor 380 performs instructions of the program 392, and thereby operates in accordance with the present invention, and particularly in accordance with the methods described in detail herein. The program 392 may be stored in a compressed, uncompiled and/or encrypted format. The program 392 furthermore includes program elements that may be necessary, such as an operating system, a database management system and "device drivers" for allowing the processor 380 to interface with computer peripheral devices. Appropriate program elements are known to those skilled in the art, and need not be described in detail herein. The memory 382 also stores an account balance 394, an account increase conditions database 396, and a disbursement conditions database 398. Note that the account balance 394 and the databases 396-398 may store the same data as the account balance 340 and databases 330 and 335, respectively. Further note that some or all of such data may be stored in peripheral device 3020 in lieu of being stored in gaming device 3010 or in addition to being stored in gaming device 3010.

Figure 4:
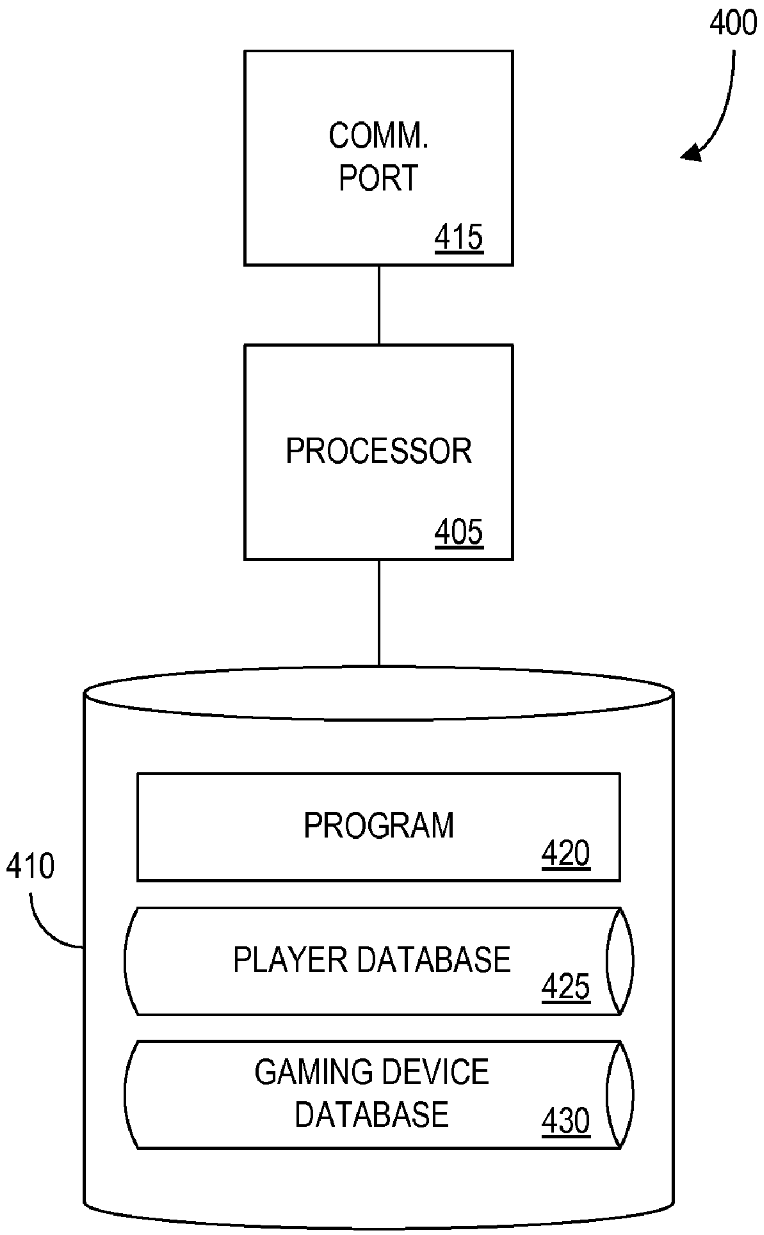
FIG. 4 is a block diagram of a computer that may be part of the system of FIG. 2A and the system of FIG. 2B, consistent with at least one embodiment of the present invention.

Referring now to FIG. 4, illustrated therein is a block diagram of an embodiment 400 of computer 210 (FIG. 2A and FIG. 2B). The computer 400 may be implemented as a system controller, a dedicated hardware circuit, an appropriately programmed general-purpose computer, or any other equivalent electronic, mechanical or electro-mechanical device. The computer 400 may comprise, for example, a server computer operable to communicate with one or more client devices, such as gaming devices 230. The computer 400 is operative to manage the system 200 and the system 250 and execute the methods of the present invention.

In operation, the computer 400 may function under the control of a casino, a merchant, or other entity that may also control use of the gaming devices 230, peripheral devices 240, and/or peripheral device server 245. For example, the computer 400 may be a slot server in a casino. In some embodiments, the computer 400 and slot server may be different devices. In some embodiments, the computer 400 may comprise more than one computer operating together. In some embodiments, the computer 400 and peripheral device server 245 may be the same device.

The computer 400 comprises a processor 405, such as one or more Intel® Pentium® processors. The processor 405 is in communication with a memory 410 and a communications port 415 (e.g., for communicating with one or more other devices). The memory 410 may comprise an appropriate combination of magnetic, optical and/or semiconductor memory, and may include, for example, Random Access Memory (RAM), Read-Only Memory (ROM), a compact disc and/or a hard disk. The processor 405 and the memory 410 may each be, for example: (i) located entirely within a single computer or other device; or (ii) connected to each other by a remote communication medium, such as a serial port cable, telephone line or radio frequency transceiver. In one embodiment, the computer 400 may comprise one or more devices that are connected to a remote server computer for maintaining databases.

The memory 410 stores a program 420 for controlling the processor 405. The processor 405 performs instructions of the program 420, and thereby operates in accordance with the present invention, and particularly in accordance with the methods described in detail herein. The program 420 may be stored in a compressed, uncompiled and/or encrypted format. The program 420 furthermore includes program elements that may be necessary, such as an operating system, a database management system and "device drivers" for allowing the processor 405 to interface with computer peripheral devices. Appropriate program elements are known to those skilled in the art, and need not be described in detail herein.

According to an embodiment of the present invention, the instructions of the program 420 may be read into a main memory from another computer-readable medium, such from a ROM to RAM. Execution of sequences of the instructions in program 420 causes processor 405 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 410 also stores a plurality of databases, including a player database 425 and a gaming device database 430. Each of these databases is described in detail below. Note that, although these databases are described as being stored in a gaming device, in other embodiments of the present invention some or all of these databases may be partially or wholly stored in another device, such as one or more of the peripheral devices 240, the peripheral device server 245, one or more of the gaming devices 230, a slot server (if different from the computer 210), another device, or a combination thereof. Further, some or all of the data described as being stored in the databases 425 and 430 may be partially or wholly stored (in addition to or in lieu of being stored in the memory 410 of the computer 400) in a memory of one or more other devices, such as one or more of the peripheral devices 240, one or more of the gaming devices 230, the peripheral device server 245 and/or a slot server (if different from computer 210).

Figure 5A:
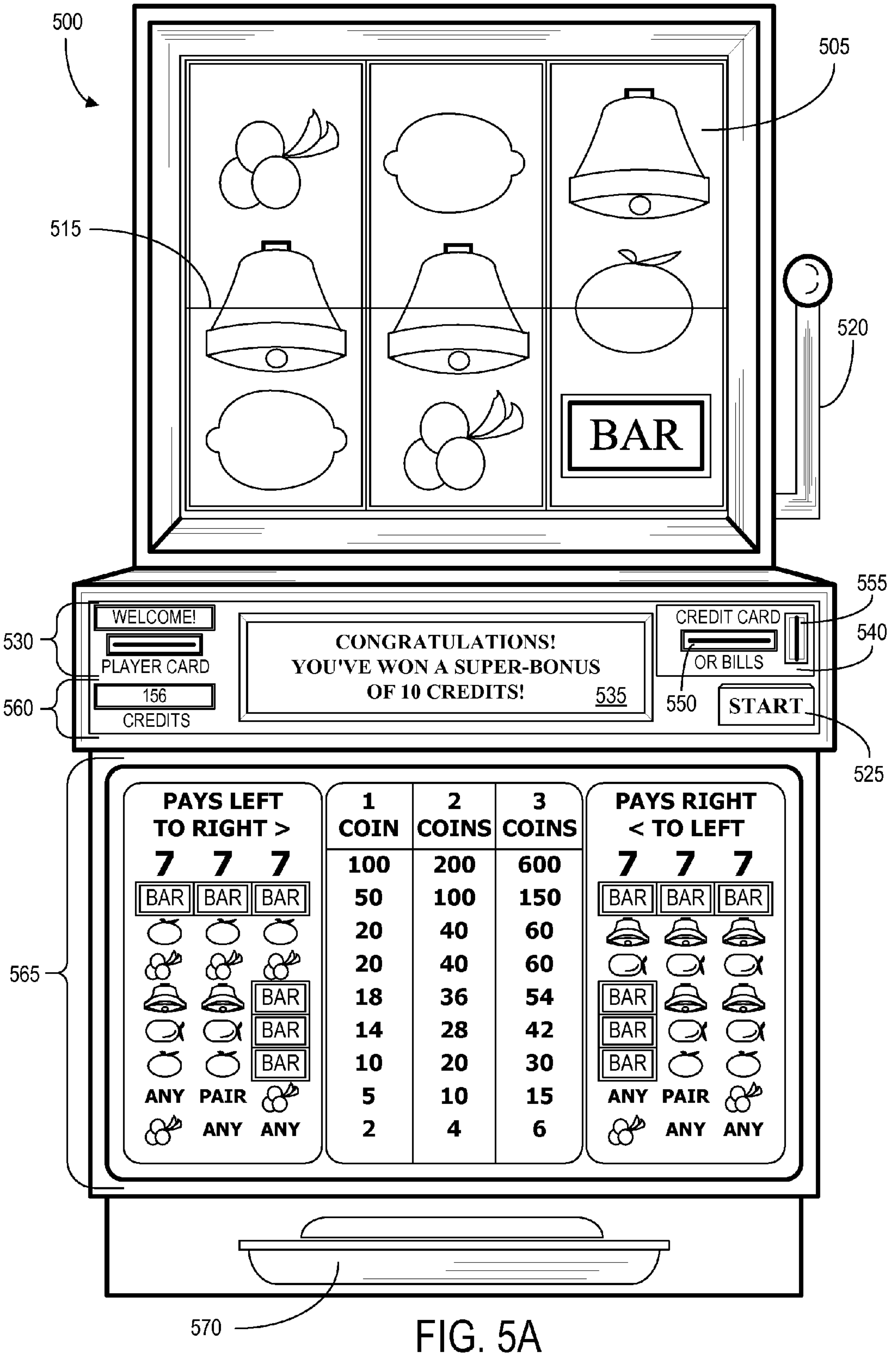
FIG. 5A is a plan view of a gaming device that may be a part of the system of FIG. 2A and the system of FIG. 2B, consistent with at least one embodiment of the present invention.

Referring now to FIG. 5A, an embodiment 500 of a plan view of a gaming device 230 is illustrated. In the embodiment 500, the gaming device 230 comprises a three reel slot machine. The slot machine 500 comprises a display area 505 in which an outcome for a game of the slot machine is displayed to the player. The display area 505 may, for example, be a video display that displays simulations of reels. The display area 505 may, in another example, be glass behind which are located mechanical reels. Display area 505 is an exemplary embodiment of the display device 355, described with respect to FIG. 3.

Within display area 505 is a payline 515. In accordance with some embodiments of the present invention, an outcome of a game is a set of symbols displayed along a payline of a reeled slot machine. Slot machine 500 exemplifies such embodiments.

Slot machine 500 further comprises a handle 520. A player may initiate the movement of the reels in display area 505 by pulling on the handle 520. Alternatively, a player may initiate the movement of the reels in display 505 by actuating the start button 525. Either or both of handle 520 and start button 525 are exemplary embodiments of the input device 365, described with respect to FIG. 3.

Slot machine 500 also comprises a player tracking device 530, which is an example of the player tracking device 360 that was described with respect to FIG. 3. The player tracking device 530 may comprise a player tracking card reader and a display (e.g., an LED display) for outputting information related to the player identifier (e.g., player's name and number of comp points associated with player's account).

Also a component of slot machine 500 is another display area 535, for outputting information to a player. The display area 535 may be utilized, for example, to inform a player that he has qualified for a bonus.

Payment system 540, an exemplary embodiment of payment system 375, comprises a bill acceptor 545, a credit card reader 550, and a coin acceptor 555. A player may utilize payment system 540 to provide a wager for playing a game.

Slot machine 500 further comprises a credit meter balance 560, which is an exemplary embodiment of a benefit output device 350 that was described with respect to FIG. 3. The credit meter balance reflects the amount of electronic credits currently available to a player. The electronic credits may be used by a player, for example, as wagers for games played on the gaming device. The electronic credits may also be "cashed out" as coins, bills, tokens, a cashless gaming receipt, and/or credits to another financial account associated with the player.

The slot machine 500 includes yet another display area, display area 565, which displays a payout schedule of the slot machine 500. The payout schedule displays payouts that correspond to various outcomes obtainable on the slot machine 500. In one or more embodiments, if an outcome is displayed in display area 505 that, as indicated in display area 565, corresponds to a payout, the credit meter balance 560 may be increased by an amount of electronic credits corresponding to the payout. In one or more embodiments, one or more of the outcomes associated with a payout in the display area 565 also have a second payout associated with the outcome in the memory of the slot machine 500. The second payout for a particular outcome will typically be greater than the payout displayed in display area 505 for the outcome. In such embodiments, if a payout that corresponds to such a second payout is displayed in display area 505, the difference between the second payout and the first payout is added to the account associated with the player.

Finally, the slot machine 500 comprises a coin tray 570. Payment to the player may be rendered by dispensing coins into the coin tray 570. Such coins may be dispensed based on, for example, a player's indication that the player would like to cash out his credit meter balance and/or a payout obtained by a player as a result of playing a game on the slot machine 500. The coin tray 500 is an exemplary embodiment of the benefit output device 350, described with respect to FIG. 3. Note that slot machine 500 may include different and/or additional components besides those illustrated in FIG. 5.

Figure 5B:
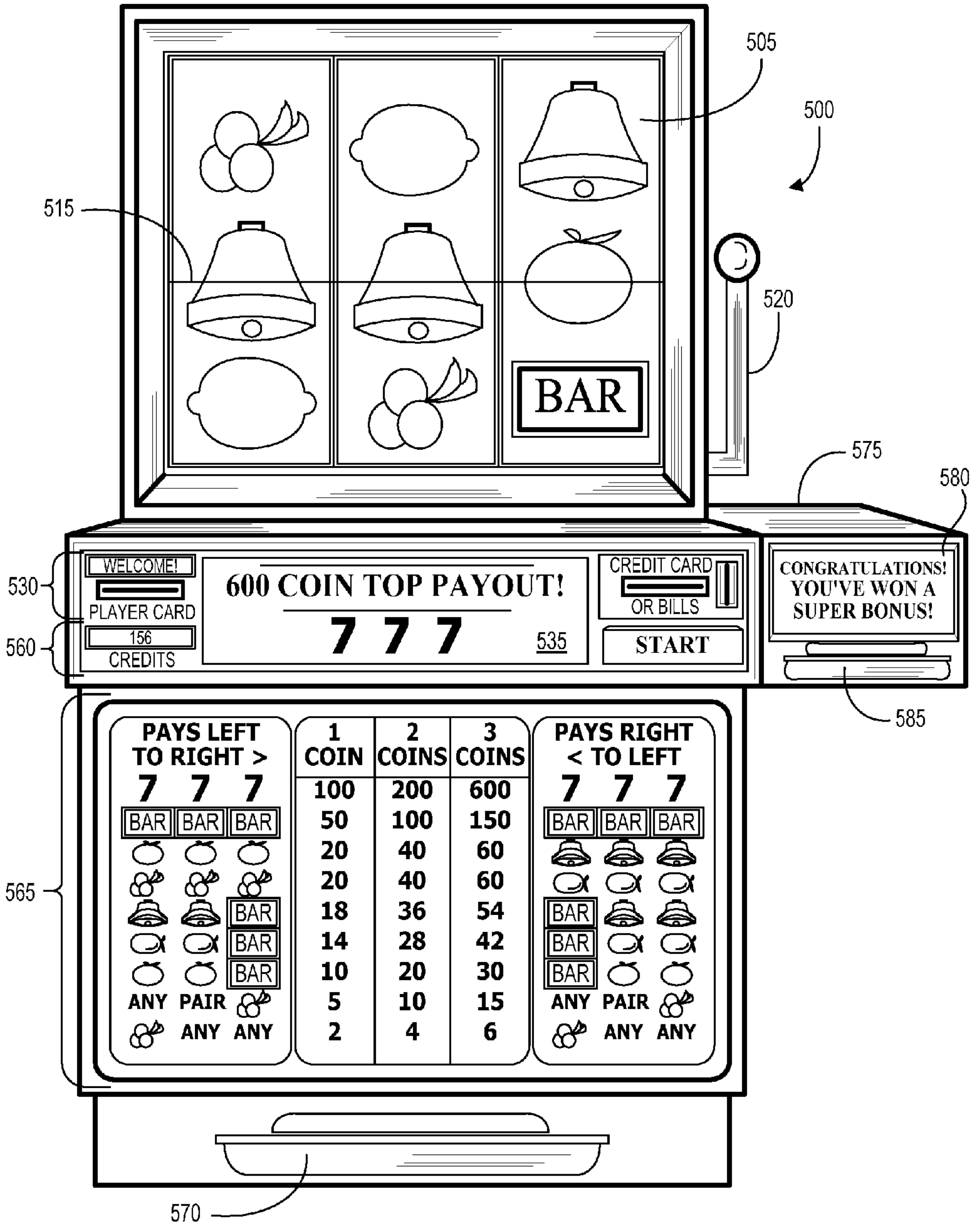
FIG. 5B is a plan view of a gaming device with an attached peripheral device, which may be a part of the system of FIG. 2B, consistent with at least one embodiment of the present invention.

Referring now to FIG. 5B, an embodiment 575 of a plan view of a gaming device 230 is illustrated. The embodiment 575 illustrates a gaming device with an attached peripheral device 580. Other than the addition of the peripheral device 580, the remaining components of gaming device 575 may be similar to those of gaming device 500 (FIG. 5A). Accordingly, the description of those components with reference to gaming device 500 is applicable to the corresponding components of gaming device 575.

The peripheral device 580 is illustrated as comprising a display 585 and a coin tray 590. The display 585 may be utilized to output messages to the player (e.g., messages that are associated with disbursements from the account established for the player). The coin tray 590 is an embodiment of the benefit output device 390 (FIG. 3B).

Note that some or all of the functions pertinent to embodiments of the present invention may be carried out by peripheral device 580 in lieu of or in addition to being carried out by gaming device 575. For example, the peripheral device may output messages and/or coins to a player based on disbursements from a player account. In some embodiments, the gaming device 575 and the peripheral device 580 may cooperate to carry out certain functions. For example, in one embodiment it may be determined that the player playing gaming device 575 should obtain a winning outcome, the payout corresponding to the outcome being funded by a disbursement from the account established for the player. Accordingly, the peripheral device 580 may direct the gaming device 575 to display a particular outcome along the payline 515 and dispense the payout associated with the outcome as coins via the coin tray 590.

Further note that, although the peripheral device 580 is illustrated as being attached to the gaming device 575, such a configuration is only one possible embodiment of a relationship between a gaming device and an associated peripheral device. In another embodiment, for example, a peripheral device that is associated with a gaming device may be located within geographical proximity to the gaming device without being directly attached to the gaming device.

Databases

Referring now to FIG. 6, an exemplary tabular representation 600 illustrates an embodiment of a prior art probability database. The tabular representation 600 of the probability database includes a number of example records or entries, each defining a random number. Those skilled in the art will understand that the probability database may include any number of entries. The tabular representation 600 also defines fields for each of the entries or records. The fields specify: (i) a random number 610 that is a random number that may be generated by the random number generator of a gaming device; and (ii) an outcome 620, that indicates the one or more indicia comprising the outcome that corresponds to the random number of a particular record. In the particular example illustrated by tabular representation 600, the outcomes comprise the three symbols to be displayed along the payline of a three reel slot machine. A gaming device may utilize a probability database such as that embodied in tabular representation 600 to, for example, determine what outcome corresponds to a random number generated by a random number generator and to display the determined outcome. Note that, in the prior art probability database of FIG. 6, only a single outcome corresponds to each random number and the gaming device utilizing such a probability table simply causes the indicia corresponding to the random number to be displayed as the result of a game on a gaming device.

Referring now to FIG. 7A, an exemplary tabular representation 700A illustrates an embodiment of a prior art payout database. The tabular representation 700A of the payout database includes a number of example records or entries, each defining an outcome that may be obtained on a gaming device that corresponds to a payout. Those skilled in the art will understand that the payout database may include any number of entries. The tabular representation 700A also defines fields for each of the entries or records. The fields specify: (i) an outcome 705A, which indicates the one or more indicia comprising a given outcome; and (ii) a payout 710A that corresponds to each respective outcome. In the example illustrated by tabular representation 700A, the outcomes are those that may be obtained on a three reel slot machine. The outcomes are also a subset of the outcomes stored as corresponding to one of the random numbers of tabular representation 600 (FIG. 6). A gaming device may utilize the tabular representation 700A to determine whether a payout should be output to a player as a result of an outcome generated for a game play by a random number generator of the gaming device (or otherwise obtained for the game play). For example, after determining the outcome to output on the gaming device (utilizing, e.g., tabular representation 600), the gaming device may access tabular representation 700A to determine whether the outcome for output is one of the outcomes stored as corresponding to a payout. If it is, the gaming device provides the corresponding payout to the player. In some gaming devices, the data in tabular representation 600 and tabular representation 700A may be combined and stored in a single table. For example, the payout (even if it is zero) that corresponds to each outcome of the tabular representation 600 may be stored in an additional field of tabular representation 600.

The book "Winning At Slot Machines" by Jim Regan (Carol Publishing Group Edition, 1997) provides further discussions of payout databases and probability databases and how they may be derived. The entirety of this book is incorporated by reference herein for all purposes.

Referring now to FIG. 7B, an exemplary tabular representation 700B illustrates an embodiment of a payout database consistent with one or more embodiments of the present invention, as it may be stored in a gaming device such as gaming device 230. The tabular representation 700B of the payout database includes a number of example records or entries, including records R700B-10-R700B-40, each defining an outcome that may be obtained on a gaming device. Those skilled in the art will understand that the payout database may include any number of entries. The tabular representation 700B also defines fields for each of the entries or records. The fields specify: (i) an outcome 705B, which indicates the one or more indicia comprising a given outcome; (ii) a displayed payout 710B that corresponds to each respective outcome, the displayed payout comprising the payout for the outcome that is displayed to a player of a gaming device (e.g., on a payout schedule of the gaming device); and (iii) an actual payout 715B that corresponds to each respective outcome, the actual payout comprising the actual payout amount that was utilized in calculating the house advantage for the gaming device. Note that, for outcomes that correspond to both a displayed payout and an actual payout in tabular representation 700B, the actual payout is greater than the displayed payout for any given outcome, consistent with one or more embodiments of the invention.

In the example illustrated by tabular representation 700B, the outcomes are those that may be obtained on a three reel slot machine. The outcomes are also a subset of the outcomes stored as corresponding to one of the random numbers of tabular representation 600 (FIG. 6). A gaming device may utilize the tabular representation 700B to determine whether a payout should be output to a player as a result of an outcome obtained for a game. The payout to be output to a player is the payout indicated in the "displayed payout" field 710B of the record corresponding to the outcome obtained by the player. For example, after determining the outcome to output on the gaming device (utilizing, e.g., tabular representation 600), the gaming device may access tabular representation 700B to determine whether the outcome for output is one of the outcomes stored as corresponding to a displayed payout. If it is, the gaming device provides the corresponding displayed payout to the player (e.g., by adding the amount of electronic credits corresponding to the displayed payout to the credit meter of the gaming device or dispensing the amount of coins corresponding to the displayed payout into the coin tray of the gaming device). The gaming device may further utilize tabular representation 700B to determine whether the balance of an account established for the player should be increased. The gaming device may perform this determination by determining whether an actual payout also corresponds to the outcome obtained by the player. If it does, the gaming device determines the difference between the displayed payout corresponding to the outcome and the actual payout. The gaming device then increases the balance of the account by this difference. For example, assuming that a player obtains the outcome of "cherry/any/any" (record R700B-10), the gaming device would determine that a displayed payout of "1" corresponds to this outcome. The gaming device would therefore output, for example, one coin to the player. The gaming device would also determine that an actual payout of "2" corresponds to the outcome of "cherry/any/any". Accordingly, after determining that the difference between the actual payout and the displayed payout is one (2−1=1), the gaming device would increase the balance previously established for the player by one. Note that, in one or more embodiments, one or more outcomes may correspond to an actual payout (e.g., 1 coin) but not to any displayed payout.

Note that the displayed payouts of tabular representation correspond to a payback percentage of 81.68% while the actual payouts correspond to a payback percentage of 94.50%. Such percentages may, of course, be adjusted as desired. This means that, if none of the currency accumulated in an account for the benefit of a player were ever disbursed to the player in the form of payouts, bonuses, or other benefits, the player would essentially be playing a gaming device with an 81.68% payback percentage. However, since the currency accumulated in an account is disbursed to the player, the payback percentage will be higher than the minimum of 81.68%. As discussed above, in one or more embodiments, any currency accumulated in an account for the benefit of a player is disbursed to a player throughout a gaming session and any balance remaining at the end of a gaming session is disbursed to the player before the player leaves the gaming device. In such embodiments the player is effectively playing a gaming device with a 94.50% payback percentage since the actual payouts are eventually all paid out to the player in one form or another, even if not at the exact time when the player obtains outcomes that correspond to the actual outcomes.

In some gaming devices, the data in tabular representation 600 and tabular representation 700B may be combined and stored in a single table. For example, the displayed payout (even if it is zero) and actual payout (even if it is zero) that corresponds to each outcome of the tabular representation 600 may be stored in two respective additional fields of tabular representation 600.

Referring now to FIG. 7C, an exemplary tabular representation 700C illustrates an embodiment of a payout database consistent with one or more embodiments of the present invention, as it may be stored in a gaming device such as gaming device 230. The tabular representation 700C of the payout database includes a number of example records or entries, including records R700C-10-R700C-50, each defining an outcome that may be obtained on a gaming device. Those skilled in the art will understand that the payout database may include any number of entries. The tabular representation 700C also defines fields for each of the entries or records. The fields specify: (i) an outcome 705C, which indicates the one or more indicia comprising a given outcome; (ii) a displayed payout 710C that corresponds to each respective outcome, the displayed payout comprising the payout for the outcome that is displayed to a player of a gaming device (e.g., on a payout schedule of the gaming device); and (iii) an additional hidden payout 715B that corresponds to each respective outcome, the additional hidden payout comprising an amount that is to be added to an account of a player if an outcome corresponding to the additional hidden payout is obtained by the player (and if, e.g., one or more additional conditions are satisfied).

In the example illustrated by tabular representation 700C, the outcomes are those that may be obtained on a three reel slot machine. The outcomes are also a subset of the outcomes stored as corresponding to one of the random numbers of tabular representation 600 (FIG. 6). A gaming device may utilize the tabular representation 700C to determine whether a payout should be output to a player as a result of an outcome obtained for a game. The payout to be output to a player is the payout indicated in the "displayed payout" field 710C of the record corresponding to the outcome obtained by the player. For example, after determining the outcome to output on the gaming device (utilizing, e.g., tabular representation 600), the gaming device may access tabular representation 700C to determine whether the outcome for output is one of the outcomes stored as corresponding to a displayed payout. If it is, the gaming device provides the corresponding displayed payout to the player (e.g., by adding the amount of electronic credits corresponding to the displayed payout to the credit meter of the gaming device or dispensing the amount of coins corresponding to the displayed payout into the coin tray of the gaming device). The gaming device may further utilize tabular representation 700C to determine whether the balance of an account established for the player should be increased. The gaming device may perform this determination by determining whether an additional hidden payout also corresponds to the outcome obtained by the player. If it does, the gaming device may increase the balance of an account established for the player by the amount of the additional hidden payout. For example, assuming that a player obtains the outcome of "cherry/any/any" (record R700C-10), the gaming device would determine that a displayed payout of "1" corresponds to this outcome. The gaming device would therefore output, for example, one coin to the player. The gaming device would also determine that an additional hidden payout of "1" corresponds to the outcome of "cherry/any/any". Accordingly, the gaming device would increase the balance previously established for the player by one. Note that, in one or more embodiments, one or more outcomes may correspond to an additional hidden payout (e.g., 1 coin) but not to any displayed payout (e.g., the outcome may correspond to a displayed outcome of zero).

Note that the displayed payouts of tabular representation correspond to a payback percentage of 81.57%. Once the additional hidden payouts are added to the displayed payouts, however, the total payback percentage is 94.50%. Such percentages may, of course, be adjusted as desired. This means that, if none of the currency accumulated in an account for the benefit of a player were ever disbursed to the player in the form of payouts, bonuses, or other benefits, the player would essentially be playing a gaming device with an 81.57% payback percentage. However, since the currency accumulated in an account is disbursed to the player, the payback percentage will be higher than the minimum of 81.57%. As discussed above, in one or more embodiments, any currency accumulated in an account for the benefit of a player is disbursed to a player throughout a gaming session and any balance remaining at the end of a gaming session is disbursed to the player before the player leaves the gaming device. In such embodiments the player is effectively playing a gaming device with a 94.5% payback percentage since the actual payouts are eventually all paid out to the player in one form or another, even if not at the exact time when the player obtains outcomes that correspond to the actual outcomes.

In some gaming devices, the data in tabular representation 600 and tabular representation 700C may be combined and stored in a single table. For example, the displayed payout (even if it is zero) and additional hidden payout (even if it is zero) that corresponds to each outcome of the tabular representation 600 may be stored in two respective additional fields of tabular representation 600.

Referring now to FIG. 8, an exemplary tabular representation 800 illustrates an exemplary embodiment of an account increase conditions database 330 that may be stored in gaming device 300A (FIG. 3A) and/or an account increase conditions database 396 that may be stored in a peripheral device 300B (FIG. 3B). The tabular representation 800 of the account increase conditions database includes a number of example records or entries, including entries R800-10-R800-50, each defining a condition that, if satisfied, will result in an increase in the balance of an account associated with a player. Those skilled in the art will understand that the account increase conditions database may include any number of entries. The tabular representation 1000 also defines fields for each of the entries or records. The fields specify: (i) a condition identifier 805 that uniquely identifies a condition, (ii) a description of a condition 810, (iii) an amount of increase 815 that indicates the amount by which the balance of an account is to be increased if a condition corresponding to the amount is satisfied, and (iv) a source 820 that identifies the entity providing the amount by which the balance of the account is to be increased. The conditions illustrated in tabular representation 800 are exemplary only and other conditions will be understood by one of ordinary skill in the art after reading the present application.

Note that there may be more than one source of a particular amount by which the balance of an account is to be increased. For example, record R800-10 illustrates a condition that corresponds to two sources: the casino and the player. When a source other than the player is funding an amount of an increase, no funds that are due to the player are withheld from the player. When the player is a source of an increase, funds that are due to the player are withheld from the player and added to the account established for the benefit of the player. For example, record R800-50 indicates that the player is the source of the amount of the increase that is added to the account established for the benefit of the player if condition "CI-010" is satisfied. This condition states that the balance of the account established for the benefit of the player will be increased if (i) an outcome corresponding to an increase is generated, and (ii) the sum of the player's winnings within the last fifteen minutes is less than thirty coins. The amount of the increase corresponding to this condition is to be determined "per payout table". Such a condition may be utilized, for example, in conjunction with a payout database such as that represented by tabular representation 700B or tabular representation 700C.

For example, a gaming device utilizing both the tabular representation 800 and the tabular representation 700B, upon generating an outcome of "cherry-cherry-cherry" may determine that an actual payout of twenty coins and a displayed payout of eighteen coins corresponds to the outcome. The gaming device may then determine whether the second part of condition "CI-010" has been satisfied: whether the winnings of the player currently playing the gaming device are less than thirty coins for the past fifteen minutes. If the gaming device determines that the second portion of condition "CI-010" has been satisfied, the gaming device may increase the balance of an account established for the benefit of the player by two coins (the difference between the displayed payout and the actual payout), thus increasing the balance by an amount as per the payout table. The funding source of such an increase is the player, since the additional two coins are actually due to the player based on the outcome generated by the gaming device but are temporarily withheld from the player (until they are disbursed from the account to fund a payout, bonus, or other benefit provided to the player). The gaming device would also provide the displayed payout of eighteen coins to the player based on the generated outcome of "cherry-cherry-cherry" and would display the outcome to the player.

Note that if the gaming device in the above example had determined that the second part of condition "CI-010" had not been satisfied, the gaming device may provide the player with twenty coins rather than eighteen coins, based on the actual outcome due to the player based on the outcome generated by the gaming device. The gaming device may provide the twenty rather than eighteen coins in a variety of manners. For example, the gaming device may display the "cherry-cherry-cherry" outcome to the player and output the eighteen coins displayed as the payout that corresponds to this outcome and further provide the player with the additional two coins that are the difference between the displayed payout and the actual payout as a "random bonus". Alternatively, the gaming device may enable a bonus round or feature of the gaming device and ensure that the outcome of the bonus round or feature results in the player winning two additional coins. In yet another alternative method, the gaming device may determine an outcome that corresponds to a displayed payout that is the same as the actual payout of the outcome that was initially generated. That is, the gaming device may determine an outcome that corresponds to a displayed payout of twenty coins. For example, record R700B-35 of tabular representation 700B indicates that the outcome "bell-bell-bell" corresponds to a displayed payout of twenty coins. The gaming device may then display the outcome of "bell-bell-bell" to the player rather than the outcome of "cherry-cherry-cherry" and provide the player the twenty coins. Alternatively, after determining the outcome of "bell-bell-bell" the gaming device may first display the outcome of "cherry-cherry-cherry" to the player, leading the player to believe that he has won eighteen coins in accordance with the displayed payout schedule. The gaming device may then change the displayed payout from "cherry-cherry-cherry" to "bell-bell-bell" (e.g., along with a message such as "I think we can do better than that! Let's see how we can improve your outcome.") and output the corresponding displayed payout of twenty coins.

The above-described method of determining an alternate outcome to display as a result of a game play (e.g., in lieu of or after the outcome generated based on a random number generator) may be utilized in conjunction with other conditions in tabular representation 700B, to realize the effects of the conditions. For example, record R800-25 indicates that if the condition "CI-004" is satisfied (i.e., the player of a gaming device obtains five winning spins in a row), two coins are to be added to the account established for the benefit of a player. The source of these two coins, as indicated in record R800-25, is the player. Thus, two coins are to be withheld from the player (e.g., the next time a winning outcome or bonus is generated for a game play initiated by the player). The gaming device may effectuate this withholding of two coins from the player via a variety of methods. One method, consistent with an embodiment of the present invention, may comprise withholding the two coins from a payout that corresponds to an outcome generated by a random number generator of the gaming device. This may be done by determining an alternate outcome, an outcome that corresponds to a payout that is less than the payout corresponding to the outcome generated by the random number generator by two coins.

For example, assume a gaming device is utilizing a prior art payout table such as that illustrated in tabular representation 700A in conjunction with the account increase conditions database 800. Further assume that the random number generator has generated a random number that corresponds to the outcome "plum-plum-plum" (i.e., the random number generator has generated the outcome of "plum-plum-plum"). Tabular representation 700A indicates that the outcome "plum-plum-plum" corresponds to a payout of twenty coins. Further assume that the condition "CI-004" has been satisfied and the gaming device is to withhold two coins from the player. To effectuate this withholding the gaming device may, rather than displaying the "plum-plum-plum" outcome to the player, determine an outcome that corresponds to a payout of eighteen coins (the difference between the twenty coin payout corresponding to the outcome generated by the random number generator and the two coins to be withheld from the player). Table 700A indicates that the outcome "bar-bell-bell" corresponds to a payout of eighteen coins. Accordingly, the gaming device may display the outcome of "bar-bell-bell" to the player rather than the outcome of "plum-plum-plum" and output the eighteen coins corresponding to that outcome to the player. Additionally, to effectuate the result of satisfying the condition "CI-004", the gaming device may add two coins to the account established for the benefit of the player.

In embodiments where an alternate outcome is determined for display to a player, the alternate outcome may be determined via a variety of methods. In one method, for example, a random number may be obtained from a random number generator and the outcome corresponding to the random number may be evaluated to determine whether it corresponds to a target payout. In another method, a payout table such as the one illustrated in tabular representation 700A may be utilized to select an alternate outcome for display based on a target payout.

If more than one source is funding an amount of an increase, each of the contributing sources are not necessarily funding the amount to an equal extent (e.g., one source may fund 75% of the amount while another source funds 25% of the amount). Note also that a fractional amount may comprise an amount of an increase, regardless of the source of the funds. For example, an amount of one-tenth of a coin or one-half of a credit may be added to the balance of an account.

Note that, in accordance with one or more embodiments, more than one possible amount of an increase to the balance of an account may correspond to a given condition. Record R800-10 illustrates such an embodiment. As indicated in record R800-10, if condition "CI-002" is satisfied, either one, two, or three coins will be added to a player's account, depending on the status of the player. If the player is an average player (e.g., wagers an average amount per predetermined period of time or spends an average amount of currency at the casino per visit), one coin will be added to the account established for the benefit of the player. If the player is a premium player (e.g., the player wagers more than an average player per predetermined period of time or spends more than an average amount of currency at the casino per visit), two coins will be added to the account established for the benefit of the player. If the player is a first-time player (e.g., this is the first time the player is playing this type of gaming device, the player has just signed up for the slot club of the casino), three coins will be added to the account established for the benefit of the player. Information necessary to determine whether a player is an average, premium, or first-time player may be stored in and retrieved from a player database, which is described in detail below.

The conditions in the account increase conditions database may be created and updated, for example, by casino personnel, a gaming device manufacturer, a game designer, and/or any other entity that has access to the memory in which the account increase conditions database is stored.

Referring now to FIG. 9, an exemplary tabular representation 900 illustrates an exemplary embodiment of a disbursement conditions database such as the database 335 (FIG. 3A) that may be stored in a gaming device 300B or the database 398 (FIG. 3B) that may be stored in a peripheral device 300B. The tabular representation 900 of the disbursement conditions database includes a number of example records or entries, including records R900-10-R900-35, each defining a condition that, if satisfied, causes a disbursement from an account established for the benefit of a player. Those skilled in the art will understand that the disbursement conditions database may include any number of entries. The tabular representation 900 also defines fields for each of the entries or records. The fields specify: (i) a condition identifier 905 that uniquely identifies a condition, (ii) a description 910 of the condition, and (iii) an amount of disbursement 915.

The disbursement conditions database may be used by a device to determine whether a payout, bonus, or other benefit should be provided to a player. If one of the conditions stored in the database is determined to be satisfied based on events associated with a player, a disbursement from the account established for the benefit of the player should be made in accordance with the amount of disbursement associated with the condition satisfied. For example, record R900-10 indicates that if a player actuates the cashout button of a gaming device, the entire balance of the account established for the benefit of the player is to be disbursed to the player.

Note that a disbursement from an account established for the benefit of a player may be provided to the player as a payout, bonus, or other benefit. The form of the disbursement (e.g., whether a payout or bonus) may be determined in a variety of manners.

In one embodiment, the device making the determination may be programmed to always provide a disbursement in the same form (e.g., always as a bonus via a bonus round of a game). In another embodiment, the device making the determination may randomly select the form in which the disbursement is to be made. For example, each possible form (e.g., payout, bonus, cocktail, admission ticket to event, free game plays) may be associated with a random number or range of random numbers. A random number may be obtained from a random number generator and the form of disbursement determined by comparing the obtained random number to the random numbers or range of random numbers associated with each of the possible forms. In yet another embodiment, a casino employee may make the determination. The casino employee may make such a determination for, for example, a particular disbursement or for a group of disbursements (e.g., all disbursements for a particular player or all disbursements made to all players playing during a particular time or at a particular gaming device or group of gaming devices). In yet another embodiment, the determination of the form of the disbursement may be made based on the amount of the disbursement. For example, a one coin disbursement may be deemed to be insufficiently motivating to be provided as a bonus or payout but may be sufficient to cover a cost of a cocktail to be provided to the player. In yet another embodiment, the determination of the form of disbursement may be based on information associated with a player (e.g., the player database may store an indication of the preferred form of disbursement associated with a player).

In one embodiment, the form of a disbursement may be stored in a database. For example, one or more of the conditions in the tabular representation 900 may be associated with one or more forms in which the amount of disbursement is to be made. Tabular representation 900 may, in such an embodiment, include an additional field that indicates the form of disbursement associated with a condition.

The determination of the form of disbursement may be made at a variety of times. In one embodiment, the determination may be made when an account is established for a player and may apply to all or a specified set of disbursements made from the established account. For example, at the time an account is established it may be determined that all disbursements of less than two coins are to be made in the form of a cocktail or appetizer to be provided to the player and all disbursements equal to or greater than two coins are to be made as payouts. In an alternate embodiment, the determination of the form of disbursement may be made at the time a condition for disbursement is satisfied and a disbursement is about to be made. In yet another embodiment, a determination may be made on a periodic or non-periodic basis (e.g., a casino employee may make a determination to make all disbursements in one particular type of form until further notice). Other appropriate times for determining the form of the disbursement will be understood by one of ordinary skill after reading the present description of the invention.

Note that a device utilizing a disbursement conditions database such as that illustrated in tabular representation 900 may be programmed to apply additional conditions before determining that a disbursement from an account is to be made to a player for whose benefit the account was established. For example, the device may be programmed to only make or authorize a disbursement if the balance of the account is at least equal to the disbursement amount. Thus, for example, if a condition is associated with a disbursement amount of five coins (e.g., as condition "CD-002" is, indicated in record R900-15), the gaming device may make a determination of whether the balance of the account is at least equal to five coins before making or authorizing the disbursement. If the account balance is not at least equal to the amount to be disbursed, no disbursement may be made despite the associated condition having been satisfied. In another embodiment, the disbursement amount may instead be adjusted to be the balance of the account.

In one or more embodiments, the balance of an account established for a player may be allowed to be negative. In such embodiments, the device may make or authorize a disbursement of an amount from an account even if the balance of the account is less than the amount. However, a balance of an account may, in one or more embodiments, only be allowed to be negative a predetermined number of times (e.g., during a gaming session), only for certain players (e.g., first-time players), or during certain predetermined times (e.g., during under-utilized times of the casino or in a first hour of a gaming session of a player). Note also that, in one or more embodiments, a disbursement may be a fractional amount.

In one or more embodiments, disbursements from an account established for the benefit of a player may not be allowed or enabled until the balance of the account has reached a predetermined amount. For example, a subroutine for monitoring events associated with a player to determine whether a condition for disbursing from an account established for a player has been satisfied may not be initialized or launched until the balance of the account meets or exceeds a predetermined amount (e.g., ten coins).

Note that the amount of disbursement field 915 may not necessarily store a predetermined amount (as in record R900-15) but may instead store an instruction for how the amount of the disbursement is to be determined. Record R900-20, for example, indicates that 40% of the account balance (up to a maximum of three coins) is to be disbursed if condition "CD-004" is satisfied. Record R900-25, as another example, indicates that the cost of providing a cocktail and appetizer to the player is the disbursement amount. The cost may comprise the cost to the casino of providing the cocktail and appetizer or a retail price that a player would normally pay for the cocktail and appetizer.

Note that the amount of disbursement field 915 may also store an indication of the form of benefit to be provided to the player. Record R900-25, for example, indicates that the form of the benefit is consumable goods and that, in particular, the goods are a cocktail and appetizer. In another embodiment, the amount of disbursement field 915 may more generally specify that the amount of disbursement is the cost of whatever benefit is provided to the player, without specifying the particular benefit to be provided.

In one or more embodiments, a disbursement made to a player may be conditioned on one or more requirements that the player must abide by in order to realize the full benefit of the disbursement. Record R900-35 illustrates one example of a disbursement conditioned on one or more requirements. Record R900-35 indicates that twenty-five coins are to be disbursed to a player for use in wagering, with the requirement that the player must utilize each of the twenty-five coins within the next five minutes. Assuming that the player is playing a one coin gaming device (i.e., it costs one coin to play one game play), using twenty-five coins in five minutes would require the player to play five game plays per minute. A disbursement with such a requirement may be a useful means of increasing the rate of play of a player who is initiating fewer than five game plays per minute, with the goal of encouraging the player into initiating game plays with a higher frequency. Thus, as indicated by record R900-35, such a disbursement may be provided to a player who has initiated fewer than fifty game plays within the last fifteen minutes (which is three to four game plays per minute) or who has previously played with a higher frequency but who has deteriorated to a frequency of fewer than fifty game plays per minute.

Referring now to FIG. 10, an exemplary tabular representation 1000 illustrates an exemplary embodiment of a player database 425 (FIG. 4) that may be stored in computer 400. The tabular representation 1000 of the player database includes a number of example records or entries, each defining a player who may be a member of a slot club of a casino or otherwise registered with or known to a casino or other entity. Those skilled in the art will understand that the player database may include any number of entries. The tabular representation 1000 also defines fields for each of the entries or records. The fields specify: (i) a player identifier 1010 that uniquely identifies a player, (ii) a name 1020 of a player, (iii) a financial account identifier 1030 associated with a player, (iv) an indication of comp points 1040 available to a player, (v) a theoretical win/[loss] 1050, (vi) an actual win/[loss] 1060 for a player, and (vii) an account balance 1070.

The information in the player database 425 may be created and updated, for example, based on information received from a player, a casino employee, a gaming device 230, a peripheral device 240, and/or peripheral device server 245. For example, the information may be created when a player registers with a casino and receives a player tracking card encoded with the player identifier. The information may be subsequently updated when a player requests to update the information (e.g. when a player indicates a desire to change a preferred character or preferred method of outputting an outcome) or when additional information is obtained about the player via the casino's interactions with the player (e.g. the lifetime theoretical win may be updated on an ongoing basis as the player plays games at a casino).

The player identifier 1010 may be, for example, an alphanumeric code associated with a player who may operate a gaming device or play a table game at a casino. The player identifier 1010 may be generated or selected, for example, by the computer 210 or by the player (e.g., when a player first registers with a casino). For each player, the player database 425 may also store the player's name 1020 (e.g., for use in outputting messages to the player). In one or more embodiments the player's name may comprise a nickname or other designation for the player that is selected by the player or the casino. In one or more embodiments, the nickname may comprise a designation that reflects the player's status (e.g., "premium player"). Such a status may indicate, for example, the typical spending range of the player or other indication of how valuable the player is considered to be by the casino. Such a designation may or may not be known to the player.

The financial account identifier 1030 (e.g., a credit card account number, a debit card account number, a checking account number, a casino financial account number, or digital payment protocol information) associated with the player. The financial account identifier 1030 may be used, for example, to credit a payment to the player (e.g., wherein a benefit obtained by the player comprises a monetary amount) and/or to debit a wager amount.

The comp points 1040 stores an indication of the number of comp points that a player is currently entitled to. Comp point programs are a common method for a casino to reward players by awarding points to players as a reward for certain gambling behavior that a casino finds desirable. Although the comp points programs differ from casino to casino, in a typical comp point program a player accumulates comp points based on (i) a total amount of coins wagered, or (ii) a total amount of coins paid out. Alternatively, comp points may be awarded based on, for example, (i) the length of time or a number of game plays at a gaming device or table game; (ii) the average wager of a player; and/or (iii) for playing a particular gaming device or group of gaming devices. As the player accumulates comp points the player may exchange some or all of the comp points for goods or services specified by the comp point program. For example, a player may exchange 1000 comp points for a dinner at a casino restaurant. As the player exchanges comp points for a good or service the exchanged comp points are deducted from the player's comp point balance reflected in field 1040 of tabular representation 1000. In some comp point programs the rewards are defined in terms of dollar amounts rather than points. In yet other comp point programs the points are exchangeable into dollar amounts based on a schedule defined by the casino, allowing the player to convert the accumulated points into dollar amounts and then use the dollar amounts to purchase goods or services from the casino.

The theoretical win/[loss] 1050 stores an indication of the theoretical win of the player based on the playing activity of the player since the playing activity of the player has been tracked. In other words, the historical theoretical win/[loss] 1050 may be a "lifetime" theoretical win. In other embodiments a historical theoretical win/[loss] based on other periods of time may be stored in addition to or instead of the lifetime historical theoretical win/[loss]. For example, an annual or session theoretical win/[loss] may be stored. Note that in most situations the house records theoretical win only. A theoretical loss is possible, but only when the player has an advantage over the house, as in some video poker games with generous payout schedules. The actual win/[loss] 1060 stores an indication of the actual dollar amount that the corresponding player has won or lost while gambling at the casino. A loss is indicated in brackets in the tabular representation 1100.

It should be understood that although a player identifier and information related to each registered player is described in detail, a player need not be registered in order to obtain benefits of the present invention (e.g., have an account established on the player's behalf and obtain payouts and/or bonuses funded by currency in the account). Accordingly, registration of a player and storing of information related to a player is not necessary for practice of the present invention.

The hidden account balance 1070 stores a monetary amount that is available for funding payouts to the player with whom a respective hidden account balance is associated. In accordance with one or more embodiments of the present invention, a portion of a player's wager amounts or a portion of payouts obtained by the player may be deducted and added to a hidden account balance associated with the player. In one or more embodiments, a casino may add funds to the hidden account associated with a player in response to certain desired gambling or other behavior exhibited by the player. For example, 0.5% of each wager placed by a player may not go towards funding the game at the particular gaming device the player is playing but may instead be added to the hidden account associated with the player. A player may or may not be aware of such a practice and/or of the existence of such a hidden account. Such a hidden account may be used, for example, to fund an actual outcome to be output to a player. In other words, any payout corresponding to an outcome output to a player may be deducted from the player's hidden account balance.

Referring now to FIG. 11, an exemplary tabular representation 1100 illustrates one embodiment of the gaming device database 430 (FIG. 4) that may be stored in the computer 400. The tabular representation 1100 of the gaming device database includes a number of example records or entries, each defining a gaming device that may be in communication (e.g. over a LAN or WAN) with computer 400. Those skilled in the art will understand that the gaming device database may include any number of entries. The tabular representation 1100 also defines fields for each of the entries or records. The fields specify: (i) a gaming device identifier 1110 that uniquely identifies a particular gaming device (e.g., uniquely identifies a particular slot machine on a casino floor or a PC communicating with an online casino), (ii) a gaming device type 1120 that stores a description or designation of the type of gaming device, and (iii) a gaming device location 1130.

The gaming device database may be used by computer 400 to, for example, communicate with one or more gaming devices and to identify a gaming device that data is being transmitted to or received from. For example, the computer 400 may instruct a gaming device that a condition for increasing the balance of an account previously established for a player has been satisfied, transmit a random number to the gaming device, update information in one or more databases of the gaming device, and receive information associated with a player of the gaming device (e.g., a player identifier, player preferences, an indication of wagers placed or number of games played by a player, an indication of duration of play by a player at the gaming device, etc.). Some of this information may be stored in association with the gaming device.

The gaming device location 1130 stores an indication of where a particular gaming device is located. Such information may be used, for example, to determine whether a gaming device at which a winning outcome has been obtained is located within proximity of another gaming device at which a winning outcome has not been obtained within a predetermined period of time or a predetermined number of game plays. For example, in one embodiment it may be desirable to lessen the chance that a player playing a gaming device who has not obtained a winning outcome in over fifteen minutes is not discouraged to the point of walking away when another nearby player obtains a large payout. Accordingly, the computer 400 may track whether a winning outcome has been obtained on a gaming device (or an outcome that corresponds to a payout that is greater than a predetermined amount) and, if such an event occurs, may poll other gaming devices within the vicinity of the gaming device at which the winning outcome was obtained. If it is determined that a player at another gaming device has not obtained a payout within a predetermined period of time, for example, the computer 400 may direct the gaming device at which that player is playing to output a bonus to the player, funded by the currency in an account previously established for the player.

Processes

Figure 12:
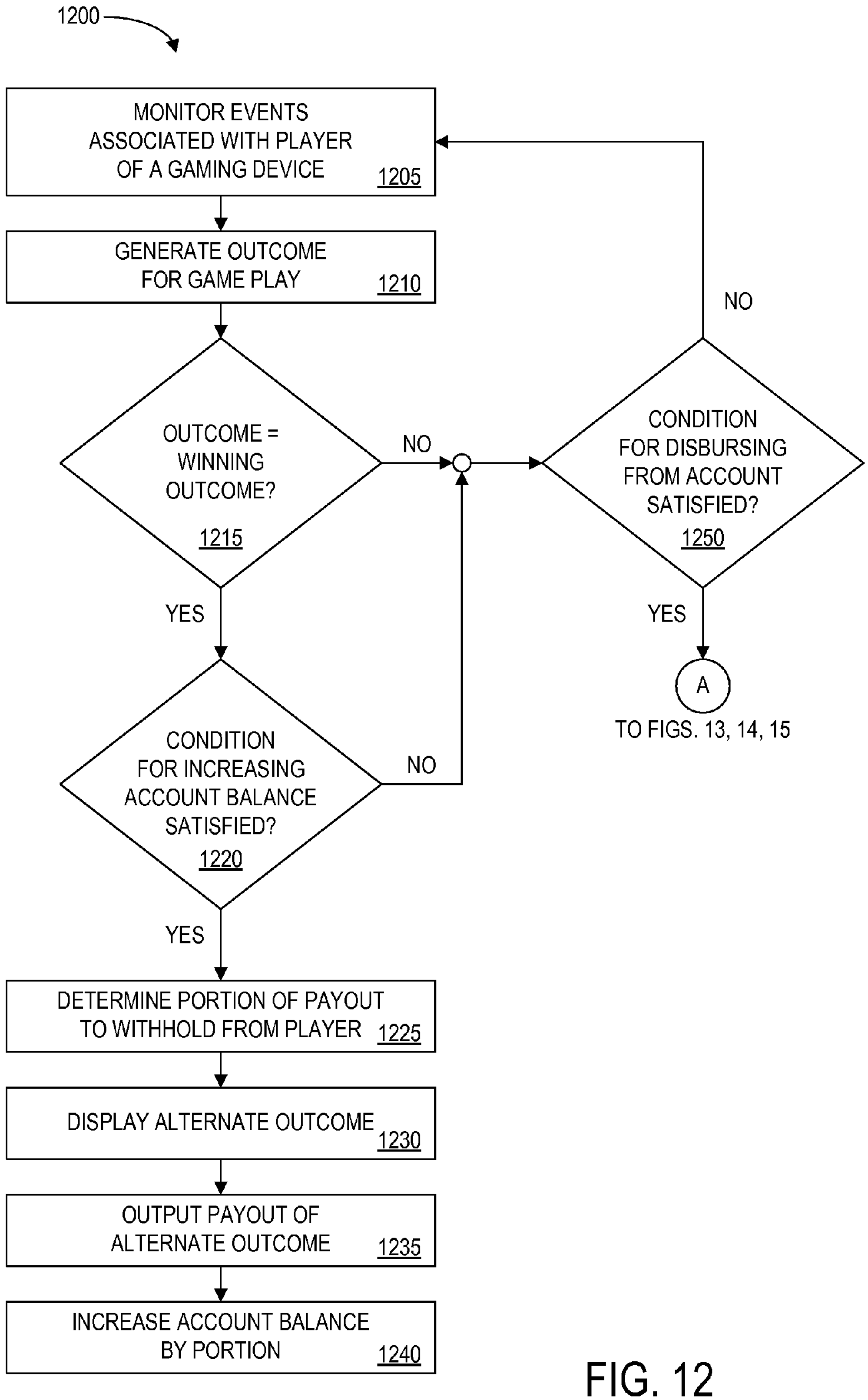
FIG. 12 is a flowchart illustrating a process for accumulating currency in an account established for the benefit of a player by withholding a portion of a payout due to a player by determining and displaying an alternate outcome that corresponds to a smaller payout, in accordance with at least one embodiment of the present invention.

Referring now to FIG. 12, a flowchart illustrates a process 1200 that is consistent with one or more embodiments of the present invention. The process 1200 is a method for accumulating currency in an account established for the benefit of a player by withholding a portion of a payout established for the benefit of the player. Of course, other methods of accumulating currency in an account are encompassed by the scope of the present invention. For purposes of illustrating process 1200, an example of a particular game play initiated by a player of a gaming device will be described below.

The process 1205 may begin when a device (e.g. a gaming device 230, a peripheral device 240, computer 210, and/or peripheral device server 245) begins to monitor events associated with a player of a gaming device. The events being monitored may include any events that potentially may satisfy one or more conditions for adding currency to or disbursing currency from an account established for the benefit of a player.

Step 1205 may be similar to step 120, described with respect to process 100 (FIG. 1). As discussed with respect to step 120, monitoring events associated with the player may comprise monitoring activities of the player, activities of other players (e.g., a friend or family member of the player who is also gambling in the casino or a person at a nearby gaming device), activities of casino personnel, or events not pertaining to an activity. Examples of events not pertaining to an activity that may be monitored include (i) a current time of day, week, month, or year, (ii) a temperature inside the casino or in another location, (iii) a status of an area of the casino (e.g., how many gaming devices are currently being played in a predetermined area of the casino), and (iv) an availability of a benefit (e.g., how many empty seats to a show in the casino are available). For example, a casino that is operating the gaming device being played by the player may determine that it is desirable to disburse currency from the account established for the benefit of a player if it is approximately dinner time (e.g., between 4:30 and 7:30 p.m.) and the player has not obtained an outcome that corresponds to a payout of at least fifty coins in over thirty minutes. This may be because, under such circumstances, the casino may conclude that a player is likely to be discouraged and hungry, a combination that is likely to cause the player to stop playing the gaming device. In this example, the gaming device or another device that is monitoring events associated with the player (e.g., a peripheral device 240 or computer 210) may be monitoring the payouts that a player has obtained as well as the current time.

In step 1210, an outcome is generated for a game play at the gaming device. This step will typically be performed in response to an initiation of a game play by a player. Accordingly, step 1210 may include monitoring for and recognizing an initiation of a game play by a player. Generating an outcome may comprise, for example, obtaining a random number (e.g. from a random number generator of the gaming device being played by the player) and determining which outcome corresponds to the random number (e.g., based on a probability table stored in memory). For purposes of the example being illustrated by process 1200, assume that the probability table illustrated by tabular representation 600 is being utilized by the gaming device being played by the player. For example, if the random number 03456 has been obtained (e.g., from a random number generator). Tabular representation 600 indicates that the outcome "bell-bell-bell" corresponds to the random number 03456.

In step 1215 it is determined whether the outcome generated in step 1210 is a winning outcome. In other words, it is determined in step 1215 whether the generated outcome corresponds to a payout or other benefit. Such a step may comprise, for example, determining whether the outcome corresponds to a payout or other benefit as stored in memory (e.g., as stored in a payout table). Assume for purposes of the example illustrated by process 1200 that the payout table of tabular representation 700A is being utilized by the gaming device. Accordingly, step 1215 comprises determining whether the outcome "bell-bell-bell" corresponds to a payout. Record R700-10 indicates that the outcome "bell-bell-bell" corresponds to a payout of 20 coins.

If it is determined in step 1215 that the generated outcome is a winning outcome, the process 1200 continues to step 1220 where it is determined whether a condition for increasing the balance of an accounts established for the benefit of a player has been satisfied. Such a determination may comprise, for example, determining whether a conditions stored in memory has been satisfied. In another example, such a determination may comprise determining whether a signal from a casino employee or another device has been received (e.g. whether another device or a casino employee has directed that the balance of the account be increased). Assume for purposes of the example illustrating the process 1200 that the account increase conditions database of tabular representation 800 is being utilized. Assume further that, based on the events being monitored, it is determined that condition "CI-004" has been satisfied (i.e., the player obtained five consecutive winning outcomes).

If it is determined in step 1220 that a condition for increasing the balance of the account has been satisfied, the process 1200 continues to step 1225 where the portion of the payout to withhold from the player is determined. Note that, at this point in the process 1200, the outcome generated in step 1210 has not yet been displayed or otherwise indicated to the player. The process 1200 up to this point, for example, may be performed during the time the reels of a slot machine are spinning (if the gaming device being played by the player is a slot machine) or the time during which the cards of a poker hand are being revealed (if the gaming device is a video poker device).

Returning to step 1225, determining the portion of the payout of the generated outcome to withhold from the player may comprise, for example, determining an amount stored in memory. Such an amount may comprise, for example, an amount stored in the memory of a gaming device that corresponds to each or a number of conditions for increasing the balance of the account (e.g., a gaming device may be programmed to withhold one coin of a payout each time a condition for increasing the balance is satisfied or each time a certain category of condition is satisfied). In another example, the amount to withhold may be determined based on the player. For example, based on the identity of the player an amount associated with the player in a player database may be determined. In another example, the amount may be determined based on the gambling behavior of the player (e.g., during the current gaming session or for another period of time, as may be stored in the player database). The amount to withhold may also be stored in the same database as the indication of the condition that was satisfied, as illustrated in tabular representation 800. Assume for purposes of the example illustrating process 1200 that the tabular representation is being utilized to determine the amount of the payout to withhold. Accordingly, step 1225 comprises determining that two coins should be withheld from the player, since condition "CI-004" corresponds to an amount of increase of two coins (as indicated in record R800-10).

In step 1230 an alternate outcome (i.e., alternate to the outcome generated in step 1210) is determined. The alternate outcome is determined based on the portion of the payout (that corresponds to the generated outcome) to withhold from the player that was determined in step 1225. That portion was determined to be two coins. Accordingly, step 1230 may comprise identifying an outcome that corresponds to a payout which is two coins less than the payout of the outcome generated in step 1210. In the example illustrating process 1200, the payout corresponding to the outcome generated in step 1210 ("bell-bell-bell") was determined to be twenty coins. Accordingly, step 1230 comprises determining an outcome that corresponds to a payout of eighteen coins (20−2=18).

An alternate outcome may be determined using a variety of methods. For example, a random number may be obtained (e.g., from a random number generator), the outcome corresponding to the random number may be identified using a probability table, and a payout table may be used to determine whether the outcome corresponds to the appropriate payout (in the illustrating example, eighteen coins). This subroutine may be continued until an outcome corresponding to a payout of eighteen coins is determined.

Another method of determining an alternate outcome may comprise modifying the outcome generated in step 1210 and determining whether the modified outcome corresponds to the desired payout (which, in the illustrating example, is eighteen coins). For example, the first symbol of the outcome may be changed to a different symbol and the resultant outcome checked against a payout table to determine whether it corresponds to the desired outcome. This subroutine may be repeated (i.e. another symbol of the outcome changed and the resultant outcome checked against the payout table) until an outcome corresponding to the desired outcome is determined.

Yet another method of determining an alternate outcome comprises identifying the one or more outcomes in a payout table that correspond to the desired payout. In the example illustrating process 1200 the desired payout is eighteen coins. Record R700A-05 of tabular representation 700A indicates that an outcome of "bell-bell-bar" corresponds to a payout of eighteen coins. Accordingly, "bell-bell-bar" may be selected as the alternate outcome. Note that other outcomes in tabular representation also correspond to a payout of eighteen coins. For example, "bar-bell-bell" also corresponds to a payout of eighteen coins. If more than one outcome is determined as corresponding to a desired payout, one of the outcome may be selected as the alternate outcome in a random fashion. Alternately, one of the outcomes may be selected as the alternate outcome based on considerations such as which outcome requires the least alteration to the outcome generated in step 1210, which outcome is listed first in the payout table, or which outcome has not yet been obtained (or has not been obtained in the relatively longest time, as compared to the other outcomes that qualify as an alternate outcome) by the player.

Once the alternate outcome is determined, it is displayed to the player in step 1235. Displaying the alternate outcome may comprise, for example, displaying the outcome one a display device of the gaming device being played by the player. Alternatively, the outcome may be displayed on a peripheral device in communication with the gaming device. Note that the steps 1205-1230 may all be performed before any outcome is displayed to the player (e.g. may be performed as the reels of the slot machine that may comprise the gaming device are spinning). Alternately, the outcome generated in step 1210 may initially (e.g., briefly) be displayed to the player and subsequently changed to be the alternate outcome. For example, in one embodiment, the gaming device may initially display the outcome generated in step 1210 and may, after one second of display, be adjusted to be the alternate outcome. In the example illustrating process 1200, for example, the last reel of the three reel slot machine may be adjusted to from "bell" to "bar".

The payout corresponding to the alternate outcome is output to the player in step 1240. In the example illustrating process 1200, eighteen coins are output to the player. Outputting the payout may comprise, for example, directing the hopper controller to release eighteen coins from the hopper into the coin tray of the gaming device being played by the player. Alternately, outputting the payout may comprise increasing the credit meter balance of the gaming device by the amount of the payout.

In step 1240, the balance of the account established for the benefit of the player is increased by the portion of the outcome corresponding to the generated outcome that was determined in step 1225. In the example illustrating process 1200, that portion was determined to be two coins. Accordingly, in the example the balance of the account is increased by two coins in step 1240.

Note that if it had been determined (i) in step 1215 that the outcome generated in step 1210 is not a winning outcome, or (ii) in step 1220 that a condition for increasing the balance of the account had not been satisfied, the process 1200 continues to step 1250. In step 1250 it is determined whether a condition for disbursing from the account had been satisfied. Such a determination may comprise, for example, determining whether a condition stored in memory has been satisfied, based on the monitoring of events associated with the player. For example, it may be determined whether any of the conditions of the disbursement conditions database have been satisfied. In another example, the step of determining whether a condition for disbursing from the account has been satisfied may comprise determining whether a signal directing a disbursement has been received from a casino employee or from another device. In one embodiment, the step 1250 of determining whether a condition for disbursing from the account has been satisfied may be performed even if the outcome generated in step 1210 is determined to be a winning outcome and/or even if it is determined, in step 1220 that a condition for increasing the balance of the account has been satisfied.

If it is determined, in step 1250, that a condition for disbursing from the account established for the benefit of the player has been satisfied, the process 1200 continues to one of processes 1300 (FIG. 13), 1400 (FIG. 14) and 1500 (FIG. 15), represented by element "A". If it is determined that a condition for disbursing from the account has not been satisfied, process 1200 returns to step 1205 where events associated with the player of the gaming device continue to be monitored. Similarly, after the balance of the account is increased in step 1245, the process 1200 returns to step 1205. Note that, in one embodiment, events associated with a player continue to be monitored throughout process 1200 (i.e., during each of the other steps of process 1200).

Note that, as discussed with respect to FIG. 1, the steps of process 1200 (and the steps of any process described herein) may be performed by (i) a gaming device 230, (ii) computer 210, (iii) a peripheral device 240, (iv) a peripheral device server 245, and/or (v) a combination thereof. For example, the step 1205 of monitoring events associated with a player may be performed by both the peripheral device 240 and computer 210 (e.g., the peripheral device may monitor activities of the player at the gaming device while computer 210 monitors other events associated with the player). The step 1210 of generating an outcome may be performed by the gaming device being played by the player. If, for example, computer 210 determines that a condition for increasing the account established for the player has been satisfied in step 1220, the computer 210 may determine the portion of the payout to withhold from the player and may direct the gaming device to determine an alternate outcome. In one embodiment, the computer may communicate the desired payout to the gaming device (e.g., a payout that is smaller than the payout corresponding to the generated outcome by the portion to be withheld) and direct the gaming device to determine an outcome corresponding to the desired payout. In one embodiment, the entire process 1200 is performed by a single device (e.g., the gaming device being played by the player).

Note that, despite the illustration of process 1200 in FIG. 12, the steps of determining whether a condition for disbursing from an account has been satisfied and of determining whether a condition for increasing the balance of the account has been satisfied do not necessarily have to be performed after an outcome is generated. For example, such determinations may be made continuously as events associated with a player are monitored, irrespective of the timing of outcomes being generated.

Figure 13:
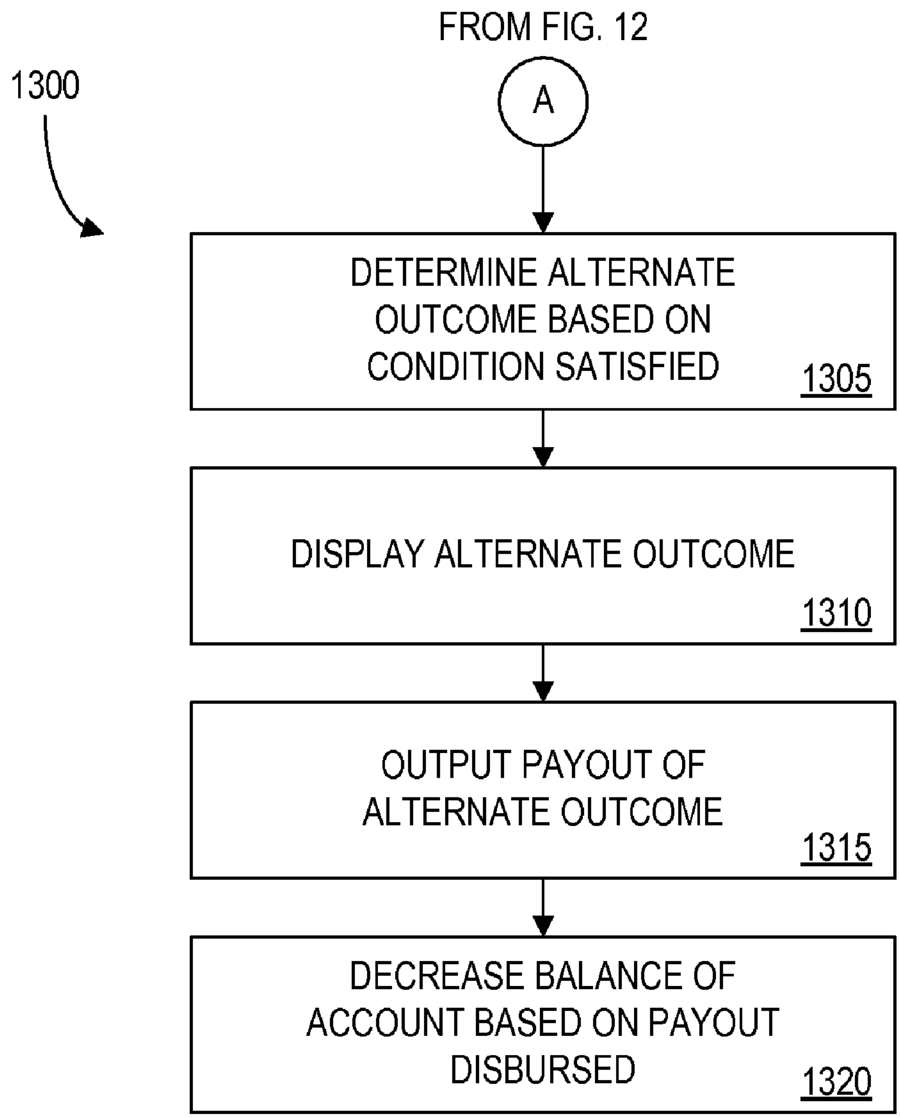
FIG. 13 is a flowchart illustrating a process for disbursing an amount from an account in the form of a payout, in accordance with at least one embodiment of the present invention.

Referring now to FIG. 13, a process 1300 illustrates one method for disbursing an amount from an account established for the benefit of a player. The process 1300 comprises providing a disbursement to a player in the form of a payout that corresponds to an outcome. Such a form of disbursement may be performed, for example, if it is desirable to blend the disbursement into conventional game play, such that a player is likely to perceive the payout as indistinguishable from other payouts provided as a result of game play. Such a form of disbursement may also be desirable if the game the player is playing does not include a bonus round or bonus feature that could otherwise be utilized to provide a disbursement in the form of a bonus to the player. The process 1300 is a subroutine that may be performed as a result of determining, in step 1250 of process 1200 (FIG. 12), that a condition for making a disbursement from the account established for the benefit of a player has been satisfied.

In step 1305 an alternate outcome is determined based on the condition for making a disbursement that was determined to be satisfied in step 1250 (FIG. 12). The outcome to be determined in step 1305 is alternate to the outcome generated in step 1210 of process 1200 (i.e., the outcome determined in step 1305 will be displayed to the player as an apparent result of the game play, in lieu of the generated outcome). In other words, since the outcome generated in step 1210 was not a winning outcome and a condition for making a disbursement from the account has been satisfied, an alternate outcome will be determined that corresponds to a payout and is thus a winning outcome, as a vehicle for making the disbursement to the player.

In one embodiment, the alternate outcome may be determined based on the amount of currency that is to be disbursed from the account to the player. Thus, step 1305 may comprise first determining the amount of currency to disburse to the player. Determining the amount of currency to disburse may comprise, for example, determining a disbursement amount stored in memory. For example, in one embodiment a gaming device may be programmed to disburse a predetermined amount of currency if any condition for disbursement, or a condition in a predetermined category of conditions, is satisfied. Such an amount may be a predetermined amount (e.g., ten coins) or may be determined based on a formula stored in memory (e.g., one-half of the balance of the account, rounded to the highest whole number). In another embodiment, a casino employee may specify an amount of disbursement. For example, a casino employee may be prompted to specify an amount to disburse once it is determined that a condition for disbursement has been satisfied or may provide an amount of disbursement when directing the gaming or other device to make a disbursement.

In yet another embodiment, an amount of currency to disburse to the player may be associated with one or more conditions for making the disbursement. In such an embodiment, a record in a database may store an indication of a disbursement amount in association with a condition. Accordingly, determining that a condition for disbursing an amount of currency from the account has been satisfied may further comprise determining the amount to be disbursed since the condition and the amount may be stored in the same or related records of a database. Assuming, for purposes of illustrating process 1300, that the disbursement conditions database of tabular representation 900 is being utilized by a gaming device performing process 1300, the amount to disburse to the player may be determined by accessing the record of the condition that is determined to have been satisfied in step 1250. For example, if it is determined in step 1250 that disbursement condition "CD-002" has been satisfied, record R900-20 indicates that a disbursement in the amount of five coins is to be provided to the player.

In embodiments where an amount of currency to be disbursed to the player is first determined, once the amount is determined the step 1305 comprises determining an outcome that corresponds to a payout equal to the amount to be disbursed. The methods of determining an outcome described with respect to step 1230 of process 1200 may be utilized to determine an outcome in step 1305. In the example illustrating process 1300, assume that the method of selecting an outcome from a payout table that corresponds to the desired payout (i.e., the payout equal to the amount to be disbursed) is utilized to determine an alternate outcome. Further assume that the tabular representation 700A is the payout table used to select such an outcome. Thus, in the example, an outcome corresponding to a payout of five coins is selected in step 1305. Record R700-20 indicates that the outcome of "cherry-cherry-any" corresponds to a payout of five coins. Thus, the outcome of "cherry-cherry-any" may be selected as the alternate outcome in step 1305. If more than one outcome corresponding to the desired payout is available in the payout database, a particular outcome may be determined based on factors similar to those described with respect to step 1230 of process 1200.

Another method of determining an alternate outcome may comprise determining an outcome without first determining an amount of currency to be disbursed from the account. In one embodiment, if it is determined in step 1250 that a condition for disbursing an amount of currency from the account has been satisfied, step 1305 may comprise determining an outcome that is a winning outcome without basing the determination on a desired payout. For example, a gaming device may be programmed or directed to determine any outcome that is a winning outcome. In one embodiment, there may be one or more constraints placed on this determination. For example, a constraint may be that the alternate outcome cannot correspond to a payout that is greater than the balance of the account established for the benefit of the player (or, e.g. must not be greater than ½ of the balance of the account).

The alternate outcome determined in step 1305 is displayed to the player in step 1310. Displaying the alternate outcome may comprise, for example, displaying the outcome via a display device of the gaming device being played by the player. Alternately, displaying the alternate outcome may comprise displaying the outcome on a display device of a peripheral device associated with the gaming device.

In one embodiment, only the alternate outcome and not the outcome generated in step 1210 may be displayed to the player. In such an embodiment, the player may never be aware of the generated outcome. In another embodiment, the outcome generated in step 1210 may first be displayed to the player and then modified to be the alternate outcome. In such embodiments, the determination of the alternate outcome may comprise selecting an outcome that comprises one or more symbols of the generated outcome (e.g., is different by one or more symbols), to minimize the modification to the generated outcome.

In embodiments where both the outcome generated in step 1210 and the alternate outcome determined in step 1305 are displayed to the player, both may be displayed on the same display device of a gaming device being played by a player. Alternately, the outcome generated in step 1210 may be displayed on a display device of the gaming device and the alternate outcome determined in step 1305 may be displayed on a display of a peripheral device associated with the gaming device.

The payout corresponding to the alternate outcome is output to the player in step 1315. The payout may be output to the player in the form of, for example, coins dispensed into a coin tray of the gaming device or peripheral device associated with the gaming device. Alternately, the payout may be provided to the player in the form of credits added to the credit meter balance of the gaming device being played by the player.

In step 1320, the balance of the account established for the benefit of the player is decreased based on the amount disbursed to the player in the form of a payout. In one embodiment, the balance of the account is decreased by the amount of the payout such that the payout is fully funded by the account. Alternately, in another embodiment, the account may be decreased by an amount different from the payout. For example, a casino may elect to fund part of the payout. In such an embodiment a portion of the payout may be funded by the account (which, as described above, currency may be contributed to by a source such as the casino) and another portion by the casino. In one embodiment, the process 1300 may continue to step 1205 of process 1200 (monitoring events associated with a player) once the balance of the account is decreased.

Figure 14:
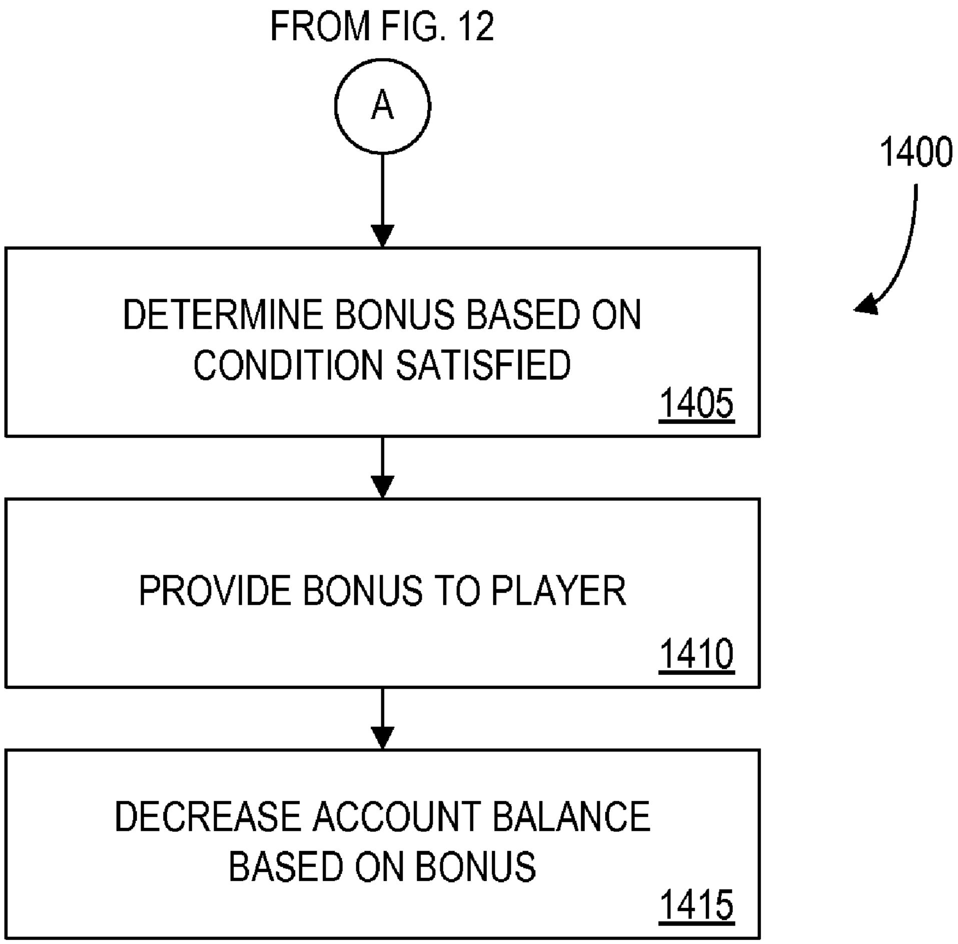
FIG. 14 is a flowchart illustrating a process for disbursing an amount from an account in the form of a bonus, in accordance with at least one embodiment of the present invention.

Referring now to FIG. 14, a process 1400 illustrates another method for disbursing an amount of currency from an account established for the benefit of a player. The process 1400 comprises providing a disbursement to a player in the form of a bonus (e.g., as a result of a bonus round or bonus feature of a game or as a seemingly random good fortune occurrence). Such a form of disbursement may be performed, for example, if it desirable to emphasize the provision of an amount of currency to a player and thus not having it blend into the conventional game play. For example, a message on a display device of a gaming or peripheral device may inform the player of a bonus by stating "Congratulations! You've won a bonus for being such a loyal patron of the casino! Thank you for playing with us!". The process 1400 is a subroutine that may be performed as a result of determining, in step 1250 of process 1200 (FIG. 12), that a condition for making a disbursement from the account established for the benefit of a player has been satisfied.

In step 1405, a bonus is determined based on the condition that was determined to be satisfied in step 1250 (FIG. 12). Step 1405 may comprise determining an amount of currency that is to be dispensed as the bonus. Such a determination may comprise, for example, determining (i) a predetermined amount of currency stored in a memory, (ii) an amount stored in association with the disbursement condition that was determined to be satisfied, and/or (iii) what amount was indicated by a casino employee or another device. Step 1405 may also comprise determining how and/or when the bonus is to be provided to the player. In one embodiment, if the gaming device is operable to perform a secondary game such as a bonus round, the gaming device or peripheral device associated with the gaming device may be programmed or directed to initialize a bonus round when it has been determined that a condition for disbursing from the account has been satisfied and to indicate a result of the bonus round that corresponds to the amount to be disbursed. In another embodiment, a gaming device or peripheral device associated with the gaming device may be programmed or directed to display a message to the player indicating that the player has won or qualified for a bonus of the amount to be disbursed.

Once a bonus is determined, the bonus is provided to the player in step 1410. For example, a gaming device or peripheral device associated with the gaming device may provide, or be directed to provide, the bonus to the player. Providing the bonus to the player may comprise displaying a message or other indication (e.g., result of a bonus round or text message without the context of a bonus round) of the bonus to the player. Providing the bonus may also comprise providing the amount of currency that is the bonus to the player. Providing the amount of currency may comprise, for example, dispensing the amount of currency in the form of coins or tokens into a coin tray of the gaming device or a peripheral device associated with the gaming device. Alternately, providing the amount of currency may comprise increasing the credit meter balance of a gaming device by the amount of currency.

The balance of the account established for the benefit of the player is decreased based on the amount of the bonus in step 1415. The decrease may be in the amount of the bonus or another amount. For example, in one embodiment a portion of the bonus may be funded from the account while another portion of the bonus may be funded by the casino or another entity. In such an embodiment, only the portion of the bonus funded from the account may be deducted from the balance of the account.

Figure 15:
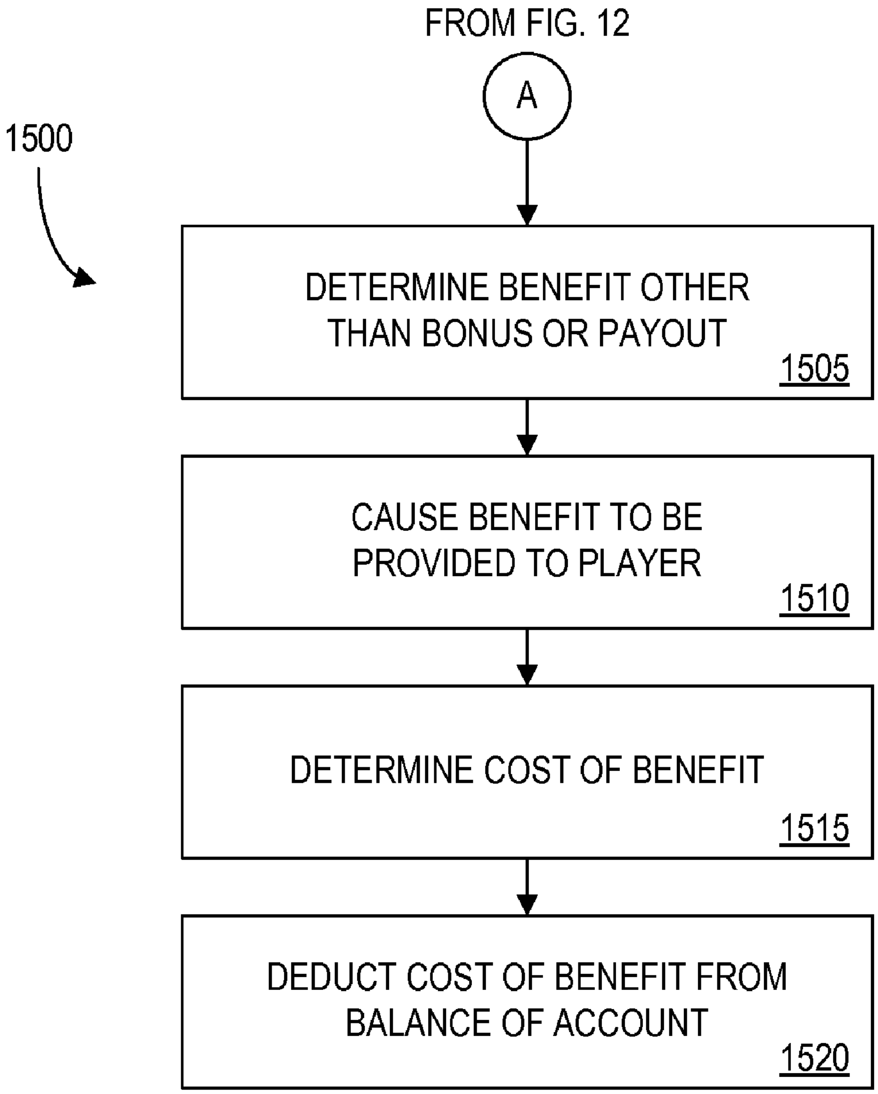
FIG. 15 is a flowchart illustrating a process for disbursing an amount from an account to pay the cost of a benefit other than a payout or bonus that was provided to a player, in accordance with at least one embodiment of the present invention.

Referring now to FIG. 15, a flowchart illustrates a process 1500 for executing a disbursement from an account established for the benefit of a player, where the disbursement is in the form of a benefit other than a payout or bonus provided to a player. The process 1500 is a subroutine that may be performed as a result of determining, in step 1250 of process 1200 (FIG. 12), that a condition for making a disbursement from the account established for the benefit of a player has been satisfied.

A benefit other than a payout or bonus may be provided to a player, for example, when it is determined that a tangible benefit such as a cocktail, food, tickets to an event, or other prize are likely to be more effective at encouraging a player to continue playing at a gaming device. Such a benefit may also be provided if, for example, a player discontinues playing a gaming device while there is still a remaining balance of the account established for the player but before a disbursement of the remaining balance can be made to the player (e.g., in the form of a bonus dispensed from the gaming device). If this occurs a casino may opt to instruct a casino employee to find the player and deliver a benefit other than a payout or bonus to the player. The casino may select a benefit the cost of which equals the remaining balance in the account, for example. Alternately, the casino may deliver the benefit to a player even after the player leaves the casino by, for example, mailing the benefit to the player via either postal or electronic mail.

Another example of the circumstances in which a benefit other than a payout or bonus may be provided to a player is if a gaming device which the player is playing is not enabled to provide a payout or bonus as a disbursement from an account established for a player. For example, a slot server embodied as computer 210 may establish an account for a player and update the balance of the account based on activities associated with the player, while the player plays a conventional gaming device that is not operable to carry out embodiments of the present invention. The slot server may direct a casino employee to provide a benefit to a player whenever the player qualifies for a disbursement.

A benefit other than a bonus or payout is determined in step 1505. Determining a benefit may comprise, for example, determining the particular item or service to provide to the player as a benefit. Determining the particular item or service may be based, for example, on the amount to be disbursed from the account. Accordingly, the step 1505 may also comprise determining the amount to be disbursed. Determining the amount to be disbursed may be done in any of the variety of manners described with respect to step 1305 of process 1300 (FIG. 13) and with respect to step 1405 of process 1400 (FIG. 14).

In one embodiment, a particular item or service to be provided as a benefit may be stored in a record of a database. For example, as described above with respect to FIG. 9, tabular representation 900 of the disbursement conditions database may store a particular benefit in association with a condition for disbursement. In such an embodiment a benefit may be determined by accessing the record of the disbursement condition and identifying the benefit associated with the condition.

In one embodiment, a benefit is determined by selecting a benefit the cost of which is equal (or approximately equal to or comes closest to equaling) the amount to be disbursed from the account. For example, a device (e.g., computer 210, a gaming device 230, a peripheral device 240, and/or peripheral device server 245) may store (e.g., in a database, RAM, or ROM) an indication of a plurality of available benefits and the cost of each respective benefit. The cost may comprise, for example, the cost incurred by the casino in providing the benefit or the price the player would be required to pay for the benefit if obtaining it through regular channels of commerce.

Once the benefit is determined, a device performing step 1510 causes the benefit to be provided to the player. Causing the benefit to be provided to the player may comprise, for example, directing another device or a casino employee to provide the benefit to the player. For example, assuming the benefit is a cocktail or snack, step 1510 may comprise directing a casino employee to deliver the cocktail or snack to the player. For example, instructions for delivering the cocktail or snack to the player may be printed or displayed at a printer or screen used by casino waiters or other employees to receive an order for or from players. In another example, assuming the benefit to be provided is a coupon or admission ticket to an event, a device such as the gaming device being played by the player (assuming the gaming device is not the device performing step 1510) may be directed to print the coupon or ticket and/or to inform the player that he has won the coupon or ticket.

The cost of the benefit is determined in step 1515. As described above, the cost of the benefit may comprise, for example, the cost to the casino of providing the benefit to the player. The cost of the benefit may alternately comprise a price the player would otherwise be required to pay for the benefit. The cost may be determined, for example, by determining a cost of the benefit as stored in a memory of a device or from a source accessible by a device. For example, assuming the benefit is a cocktail, the cost of the cocktail may be determined by accessing a menu on which the cocktail is an available item and determining the price of the cocktail to be the cost. In one embodiment, a casino employee may be prompted to specify a cost of a benefit. In one embodiment, the cost of a benefit may be determined based on information associated with the player. For example, the cost may be determined to be a first cost if the player is a premium player, a second cost if the player is an average and regular player, and a third cost if the player is a first-time player. In one embodiment, the cost of the benefit may be stored in a record of a database in association with the benefit and, for example, the disbursement condition associated with the benefit. Note that, in one or more embodiments, the step of determining the cost of the benefit may be combined with the step of determining the benefit (step 1505). This may occur in embodiments where, as described above, determining the benefit comprises first determining an amount to be disbursed and then selecting a benefit the cost of which is approximately equal to the amount to be disbursed.

Once the cost of the benefit is determined, it is deducted from the balance of the account. In one or more embodiments, the entire cost of the benefit is deducted from the balance of the account. In an alternate embodiment, part of the cost of the benefit is deducted from the account and the remainder of the cost of the benefit is funded by another entity (e.g., the casino or a manufacturer of the product or provider of the service provided as the benefit).

Note that whether subroutine 1300, 1400, or 1500 is performed depends on the form of the disbursement from the account. If a disbursement is to be provided in the form of a payout, process 1300 is performed. If a disbursement is to be provided in the form of a bonus, process 1400 is performed. If a disbursement is to be provided in the form of a benefit other than a payout or bonus, process 1500 is performed. In one or more embodiments, only one form of disbursement may be practiced. In such embodiments only the process pertaining to that form of disbursement may be programmed into a device and automatically followed when a disbursement is to be made. In other embodiments, a device may have a choice of form for a disbursement. Accordingly, the device may make a determination (e.g., after step 1250 but before following one of the processes 1300, 1400, and 1500) of what form the disbursement is to be. Such a determination may be made based on, for example, an indication received from a casino employee. Alternately, such a determination may be made based on other factors such as (i) information associated with the player (e.g., which form the player apparently prefers, as stored in the player database); (ii) information about available benefits (e.g., if there are many admission tickets to an event that starts soon available, the benefit of the admission ticket may be selected); (iii) the form of previous benefits provided to the player; (iv) a time of day, week, month, or year; (v) the particular condition for disbursement that was determined to be satisfied; and (vi) the balance of the account from which the amount is to be disbursed (e.g., a small balance may be sufficient to fund a cocktail but may be deemed insufficient to be a motivating payout).

ADDITIONAL EMBODIMENTS AND EXAMPLES

In accordance with one or more embodiments, a disbursement from an account established for the benefit of a player may be performed in response to a request from a player to modify an outcome generated for a game play. Modifying an outcome may comprise, for example, changing one or more symbols comprising the outcome. In one embodiment, the receipt of such a request may be satisfaction of a condition for making a disbursement from the account. For example, in one or more embodiments a player may be provided with an opportunity to request a modified outcome if an outcome obtained by the player is a non-winning outcome or if the player is not satisfied with the payout corresponding to the outcome obtained by the player. For example, a gaming device or peripheral device associated with a gaming device may comprise a button, touch screen area or other mechanism for requesting a modification of an outcome. In alternate embodiments, a player may make a request to have an outcome modified by using a spoken command interpreted by voice recognition software or by inserting a promotional card or coupon into the gaming device. In one embodiment, the player may be required to provide additional payment (e.g., one coin) to enable such a mechanism.

In embodiments where a player may make a request to modify an outcome, a determination may be made of whether to grant the request. The determination of whether to grant the request may comprise (i) determining whether an attempt to modify the outcome should be displayed to the player, and/or (ii) determining whether the modified outcome should correspond to a higher payout than the outcome already generated for the game play. For example, it may be determined in the first determination that not every an attempt to modify the outcome to a more favorable outcome should be made. In such an example, the player may be informed that his request cannot be granted.

If it is determined that a request to modify the outcome should be granted, it may still be determined that the modified outcome should not correspond to a payout larger than the outcome originally generated for the game play (e.g., because the balance of the account established for the benefit of the player is not sufficient to fund a larger payout). In such an example, the gaming device or peripheral device may modify the outcome but the modified outcome may correspond to a payout in the same or lesser amount than the payout corresponding to the outcome originally generated for the game play. In such a scenario, the player may be provided with the payout, if any, corresponding to the outcome originally generated for the game play.

In one or more embodiments, a determination of whether to grant the request to modify an outcome may comprise determining whether an additional condition has been satisfied (e.g., whether the player has failed to obtain a winning outcome in a predetermined number of consecutive game plays).

As noted, in one embodiment a determination of whether to grant a request to modify an outcome may comprise determining whether the balance of the account established for the benefit of a player is sufficient to fund a payout (or a payout that is larger than the payout currently due to the player as a result of the outcome generated for the game play). If it is determined that the balance of the account is insufficient, a casino may elect to provide the additional funds necessary to allow granting of the request.

In one or more embodiments, the mechanism for allowing the player to request a modification of an outcome may not be enabled until the balance of the account established for the benefit of a player reaches a predetermined balance (e.g., a balance sufficient to fund a predetermined payout). In such embodiments, the player may not be aware that the enablement of the mechanism depends on such a factor. The player may be informed, for example, that the enablement of such a mechanism is random.

In embodiments where the player provides payment with a request to modify an outcome, the payment may be added to the balance of the account established for the benefit of a player. For example, a condition for increasing the balance of the account as stored in the account increase database 330 may be a player's provision of payment with a request to modify an outcome.

A modified outcome may be output to a player in a variety of manners. For example, a player may use his finger to try to "scratch off" an outcome on a touch screen to reveal an improved outcome. In another example, an animated game character may be displayed as wandering onto the screen of a gaming device or peripheral device and modifying the outcome by changing one or more symbols comprising the outcome from a first symbol to a second symbol. A Guardian Angel character, for example, may be displayed as walking or floating onto the screen and appearing to hammer away at the third reel of a three reel slot machine until it shifted to a better symbol for the player. This display of the animated character could involve significant movement and colorful graphics to maximize the entertainment value for the player. Examples of such animated game characters include:

(i) Guardian Angel. This character may be dressed in flowing robes like an angel, and could use a magical harp to modify outcomes.

(ii) Mechanic. Perfectly suited to fixing things, this character would come with a bag of tools used to make adjustments to the slot reels.

(iii) Court Jester/Joker. Perfect for video poker embodiments.

(iv) Millionaire. This character could upwardly adjust a player's outcome and then pretend to pay for the upgrade out of his own pocket.

(v) Wizard. This character would be able to cast spells affecting the reel symbols.

(vi) Casino representative. Some casinos have executives, owners, or celebrities associated with the casino. Game characters could be created in the likeness of these people. For example, a Donald Trump character could walk onto the screen and modify a player outcome.

(vii) Television/Movie characters. These characters might include television personalities like Jeannie from "I Dream of Jeannie"™, or cartoon characters like Yosemite Sam™ or Mr. Magoo™.

(viii) Audio. A voice over describes the action as the reel symbols change.

(ix) Text. A text description of the actions taken to modify an outcome. "Let's see if we can't budge that orange symbol and turn it into a plum . . . "

(x) Customer Input. Players could upload digital images of favorite pets, for example, which would then server as game characters.

Note that, in one or more embodiments, the modification of an outcome may be performed in more than one stage. For example, instead of a non-winning outcome being directly converted into a winning outcome, the gaming or peripheral device could offer 3, 4, or even more stages. Note further that some of these stages could increase the amount of the payout, while others decrease the amount of the payout. Commonly-owned, co-pending U.S. patent application Ser. No. 10/328,116, filed in Dec. 20, 2002 in the name of Walker et al. and entitled METHOD AND APPARATUS FOR OUTPUTTING OUTCOMES OF A GAMING DEVICE discloses many other embodiments where an outcome may be modified and usage of animated characters to affect such modifications. The entirety of this Application is incorporated by reference herein for all purposes.

In accordance with one embodiment, more than one account may be established for a single player. For example, an account could be established for one or more of the following: (i) a gaming session of the player; (ii) the duration of a trip of the player to the casino (e.g. wherein the account does not zero out until the trip is over, perhaps paying out any remaining balance when the customer goes to the checkout desk); and (iii) an account that accumulates only Comp points (e.g., which removes every tenth comp point earned but gives back bonus comps).

Note that a balance of an account established for the benefit of a player may be stored at one of the following: (i) a gaming device 230, (ii) a computer 210, (iii) a peripheral device 240, and (iv) a peripheral device server 245. For example, the balance of the account may be stored in a database, RAM, ROM, or on a disk of one of the aforementioned devices. Alternately, the balance of an account may be stored on a device in the possession of a player such as a player tracking card (e.g. using a smart card), a player personal digital assistant (PDA), or key chain memory device While the invention has been described in terms of an account whose balance and/or existence is completely unknown to the player, in alternate embodiments the existence and/or balance of such an account may be indicated to a player. For example, the existence of the account may be communicated to the player but the player may not be informed of the balance of the account. In another embodiment, one or more ranges of possible balances of the account may be indicated to the player (e.g. via a color code or other scheme). In yet another example, a display of coins in a pile may be presented to the player, obscuring the size of the balance. In yet another example, the balance of the account may be indicated to the player, but only a few times per session.

In one or more embodiments, the amount of currency added to the account may not necessarily be reflected in a current balance of the account. For example, a balance of the account may initially be determined based on the amount of currency thus far accumulated but may then be randomly adjusted up and down to create a greater variance in the balance.

In one or more embodiments game symbols may be accumulated in an account instead of, or in addition to, currency. Such game symbols could then be used to modify outcomes subsequently received. For example, an outcome of "bell-bell-7" may be generated for a game play. Assume for this example that the payout table of tabular representation 700A is being utilized. The outcome "bell-bell-7" does not correspond to any payout in tabular representation 700A. Assume in this example that the player has accumulated the following four symbols: BELL, CHERRY, PLUM, and BAR. One or more of these accumulated symbols may be selected (e.g., randomly) as a replacement for the "7" symbol in the above outcome. If the player is lucky, the BELL symbol is randomly selected and used to create "bell-bell-bell". The outcome of "bell-bell-bell" corresponds to an outcome of twenty coins, which results in the player's receiving of twenty coins rather than no coins after the outcome is modified.

The following are examples of how embodiments of the present invention may be practiced:

(i) Example 1

The user sits down at a dollar denomination video reel slot machine and inserts his player tracking card and a $100 bill to begin play. Every time the player hits a payout of $20 or more, the slot machine adds one dollar to a hidden account for the player (this one dollar "surcharge" may be built into the pay table in order to maintain a reasonable house advantage). The hidden account grows in value as the player continues his gaming session. When the hidden account reaches $20 in value, the slot machine enables a "Guardian Angel" game character. Once the Angel is enabled, the player can request that the Angel attempt to "fix" an outcome. For example, if the player achieved an outcome of orange-orange-bell, he could request that the Angel attempt to modify the final reel symbol in the hopes of changing it to an orange symbol, thus resulting in a final outcome of orange-orange-orange for a payout of 20 coins.

(ii) Example 2

The user sits down at a video reel slot machine and inserts a $20 bill to begin play. After accumulating 5 coins in his hidden account, the player gets an outcome of plum-plum-orange. Disappointed that he missed the 14 coin payout for plum-plum-plum, the player elects to pay one coin in an effort to "fix the outcome." A game character comes onto the screen and attempts to fix the outcome, but is unsuccessful and gives up (perhaps only 1 in 5 attempts results in a successfully altered outcome). The coin paid by the player may go into a hidden account which is used to fund future outcome changes. The player receives no coins for the bar-bar-orange result.

(iii) Example 3

The customer begins a gaming session at a Jacks or Better video poker machine, playing a single dollar coin each hand. After playing for an hour, the customer had accumulated $25 in his hidden balance. The player is then dealt the following hand:

Ac Js 4h 4d 2c

Because the player's hidden account contains 25 coins, the slot machine determines that the above hand should be automatically altered for the benefit of the player (as long as the alteration results in fewer than 25 additional coins). The slot machine determines a new outcome of "full house", and initiates a change to be made by a court jester character. In this case, the jester character appears on screen and removes the "Js" card and tears it up, replacing it with an "Ah" card from his sleeve. The hand now stands as:

Ac Ah 4h 4d 2c

The player becomes excited since this two pair result pays 2 coins for each one coin wagered, while the original pair of fours would have paid the player nothing. But before the coins are paid, the jester character again appears on screen. He walks over to the original hand as before, this time removing the "2c" card and tearing it up. From inside his magic hat the jester produces a "4s" card and places it where the "2c" was. The hand now looks like the following:

Ac Ah 4h 4d 4s

The player has now achieved a full house, and is paid 9 coins. The hidden account is then reduced by this 9 coins to a new balance of 16 coins.

In conclusion, while the methods and apparatus of the present invention have been described in terms of particular embodiments, those skilled in the art will recognize that the present invention may be practiced with modification and alteration without departing from the teachings disclosed herein.

What is claimed is:

1. A method of operating a gaming system, said method comprising:

causing at least one display device of a gaming device to display a first payout schedule, the first payout schedule defining a plurality of winning outcomes and a first set of payouts, each respective payout of the first set of payouts having a value greater than zero and corresponding to a respective one of the plurality of winning outcomes;

causing at least one memory device to store a second payout schedule, the second payout schedule defining the plurality of winning outcomes and a second set of payouts, each respective payout of the second set of payouts having a value greater than zero and corresponding to a respective one of the plurality of winning outcomes, at least one of the winning outcomes corresponding to one of the payouts of the second set that is greater than one of the payouts of the first set;

causing at least one processor of the gaming device to execute a plurality of instructions to generate an outcome;

causing the at least one processor of the gaming device to execute the plurality of instructions to determine if the generated outcome corresponds to one of the payouts of the first set of payouts; and if the generated outcome corresponds to one of the payouts of the first set of payouts:

(i) providing to a player the payout of the first set of payouts that corresponds to the generated outcome, and (ii) adding an amount to a balance of an account associated with the player, wherein the amount added to the balance is the payout of the first set of payouts that corresponds to the generated outcome less the payout of the second set of payouts that corresponds to the generated outcome.

2. A gaming device, comprising:

a processor, and a storage device that stores a program for directing the processor to:

display a first payout schedule, the first payout schedule defining a plurality of winning outcomes and a first set of payouts, each respective payout of the first set of payouts having a value greater than zero and corresponding to a respective one of the plurality of winning outcomes, store a second payout schedule, the second payout schedule defining the plurality of winning outcomes and a second set of payouts, each respective payout of the second set of payouts having a value greater than zero and corresponding to a respective one of the plurality of winning outcomes, at least one of the winning outcomes corresponding to one of the payouts of the second set that is greater than one of the payouts of the first set, generate an outcome, determine if the generated outcome corresponds to one of the payouts of the first set of payouts, and if the generated outcome corresponds to one of the payouts of the first set of payouts:

(i) provide to a player the payout of the first set of payouts that corresponds to the generated outcome, and (ii) add an amount to a balance of an account associated with the player, wherein the amount added to the balance is the payout of the first set of payouts that corresponds to the generated outcome less the payout of the second set of payouts that corresponds to the generated outcome.

3. A non-transitory computer readable medium encoded with instructions for directing a processor to:

cause at least one display device to display a first payout schedule, the first payout schedule defining a plurality of winning outcomes and a first set of payouts, each respective payout of the first set of payouts having a value greater than zero and corresponding to a respective one of the plurality of winning outcomes;

cause at least one memory device to store a second payout schedule, the second payout schedule defining the plurality of winning outcomes and a second set of payouts, each respective payout of the second set of payouts having a value greater than zero and corresponding to a respective one of the plurality of winning outcomes, at least one of the winning outcomes corresponds to one of the payouts of the second set that is greater than one of the payouts of the first set;

generate an outcome;

determine if the generated outcome corresponds to one of the payouts of the first set of payouts; and if the generated outcome corresponds to one of the payouts of the first set of payouts:

(i) provide to a player the payout of the first set of payouts that corresponds to the generated outcome, and (ii) add an amount to a balance of an account associated with the player, wherein the amount added to the balance is the payout of the first set of payouts that corresponds to the generated outcome less the payout of the second set of payouts that corresponds to the generated outcome.

4. A method of operating a gaming system, said method comprising:

causing at least one display device of a gaming device to display a first payout schedule, the first payout schedule defining a plurality of winning outcomes and a first set of payouts, each respective payout of the first set of payouts having a value greater than zero and corresponding to a respective one of the plurality of winning outcomes;

causing at least one memory device to store a second payout schedule, the second payout schedule defining the plurality of winning outcomes and a second set of payouts, each respective payout of the second set of payouts having a value greater than zero and corresponding to a respective one of the plurality of winning outcomes;

causing at least one processor of the gaming device to execute a plurality of instructions to enable a player to place a wager on a single play of a single game;

causing the at least one processor of the gaming device to execute the plurality of instructions to generate an outcome for the single play of the single game;

causing the at least one processor of the gaming device to execute the plurality of instructions to determine if the generated outcome for the single play of the single game corresponds to one of the payouts of the first set of payouts;

if the generated outcome for the single play of the single game corresponds to one of the payouts of the first set of payouts, providing to the player the payout of the first set of payouts that corresponds to the generated outcome;

causing the at least one processor of the gaming device to execute the plurality of instructions to determine if the generated outcome for the single play of the single game corresponds to one of the payouts of the second set of payouts; and if the generated outcome for the single play of the single game corresponds to one of the payouts of the second set of payouts, adding the payout of the second set of payouts to a balance of an account associated with the player.

5. A gaming device comprising:

a processor, and a storage device that stores a program for directing the processor to:

display a first payout schedule, the first payout schedule defining a plurality of winning outcomes and a first set of payouts, each respective payout of the first set of payouts having a value greater than zero and corresponding to a respective one of the plurality of winning outcomes, store a second payout schedule, the second payout schedule defining the plurality of winning outcomes and a second set of payouts, each respective payout of the second set of payouts having a value greater than zero and corresponding to a respective one of the plurality of winning outcomes, enable a player to place a wager on a single play of a single game, generate an outcome for the single play of the single game, determine if the generated outcome for the single play of the single game corresponds to one of the payouts of the first set of payouts, if the generated outcome for the single play of the single game corresponds to one of the payouts of the first set of payouts, provide to the player the payout of the first set of payouts that corresponds to the generated outcome, determine if the generated outcome for the single play of the single game corresponds to one of the payouts of the second set of payouts, and if the generated outcome for the single play of the single game corresponds to one of the payouts of the second set of payouts, add the payout of the second set of payouts to a balance of an account associated with the player.

6. A non-transitory computer readable medium encoded with instructions for directing a processor to:

cause at least one display device to display a first payout schedule, the first payout schedule defining a plurality of winning outcomes and a first set of payouts, each respective payout of the first set of payouts having a value greater than zero and corresponding to a respective one of the plurality of winning outcomes;

cause at least one memory device to store a second payout schedule, the second payout schedule defining the plurality of winning outcomes and a second set of payouts, each respective payout of the second set of payouts having a value greater than zero and corresponding to a respective one of the plurality of winning outcomes;

enable a player to place a wager on a single play of a single game;

generate an outcome for the single play of the single game;

determine if the generated outcome for the single play of the single game corresponds to one of the payouts of the first set of payouts;

if the generated outcome for the single play of the single game corresponds to one of the payouts of the first set of payouts, provide to the player the payout of the first set of payouts that corresponds to the generated outcome;

determine if the generated outcome for the single play of the single game corresponds to one of the payouts of the second set of payouts; and if the generated outcome for the single play of the single game corresponds to one of the payouts of the second set of payouts, add the payout of the second set of payouts to a balance of an account associated with the player.

* * * * *

UNITED STATES PATENT AND TRADEMARK OFFICE

CERTIFICATE OF CORRECTION

PATENT NO. : 8,096,873 B2
APPLICATION NO. : 12/190984
DATED : January 17, 2012
INVENTOR(S) : Jay W. Walker et al.

It is certified that error appears in the above-identified patent and that said Letters Patent is hereby corrected as shown below:

IN THE CLAIMS:

In Claim 3, column 52, line 41, replace "corresponds" with --corresponding--.

Signed and Sealed this
Twenty-seventh Day of March, 2012

David J. Kappos
*Director of the United States Patent and Trademark Office*